US009093861B2

(12) United States Patent
Nakano et al.

(10) Patent No.: US 9,093,861 B2
(45) Date of Patent: Jul. 28, 2015

(54) POWER CONVERSION SYSTEM AND UNINTERRUPTIBLE POWER SUPPLY SYSTEM

(75) Inventors: Toshihide Nakano, Minato-ku (JP); Kazunori Sanada, Minato-ku (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 616 days.

(21) Appl. No.: 13/378,840

(22) PCT Filed: May 18, 2010

(86) PCT No.: PCT/JP2010/058334
§ 371 (c)(1),
(2), (4) Date: Dec. 16, 2011

(87) PCT Pub. No.: WO2011/033820
PCT Pub. Date: Mar. 24, 2011

(65) Prior Publication Data
US 2012/0086269 A1     Apr. 12, 2012

(30) Foreign Application Priority Data
Sep. 16, 2009    (WO) ................. PCT/JP2009/066182

(51) Int. Cl.
*H02J 1/10*      (2006.01)
*H02J 3/38*      (2006.01)
(Continued)

(52) U.S. Cl.
CPC ...... *H02J 9/062* (2013.01); *H02J 9/061* (2013.01)

(58) Field of Classification Search
CPC .................................. H02J 9/062; H02J 9/61
USPC ......................................... 307/23, 64; 363/34
See application file for complete search history.

(56) References Cited

U.S. PATENT DOCUMENTS

| 4,733,341 A | 3/1988 | Miyazawa |
| 6,175,512 B1 | 1/2001 | Hagihara et al. |

(Continued)

FOREIGN PATENT DOCUMENTS

| CN | 1813395 A | 8/2006 |
| EP | 0 959 552 A2 | 11/1999 |

(Continued)

OTHER PUBLICATIONS

International Search Report Issued Aug. 17, 2010 in PCT/JP10/58334 Filed May 18, 2010.

(Continued)

*Primary Examiner* — Rexford Barnie
*Assistant Examiner* — Toan Vu
(74) *Attorney, Agent, or Firm* — Oblon, McClelland, Maier & Neustadt, L.L.P.

(57) ABSTRACT

An uninterruptible power supply system includes a plurality of uninterruptible power supply devices connected in parallel between a commercial AC power supply and a load; and a control unit selecting the required number of uninterruptible power supply devices for driving the load from the plurality of uninterruptible power supply devices, to cause each selected uninterruptible power supply device to be operated and to cause each remaining uninterruptible power supply device to be stopped. This control unit changes the uninterruptible power supply devices to be operated from one to another in a predetermined cycle such that the plurality of uninterruptible power supply devices are identical in operation time to one another. Accordingly, the continuous operation time of each of the uninterruptible power supply devices can be shortened, so that failures occurring in each uninterruptible power supply device can be reduced.

19 Claims, 16 Drawing Sheets

(51) Int. Cl.
    *H02J 9/00* (2006.01)
    *H02J 9/06* (2006.01)

(56) References Cited

U.S. PATENT DOCUMENTS

| 6,252,785 B1 * | 6/2001 | Hagihara et al. ............. 363/71 |
| 2001/0043013 A1 | 11/2001 | Abe |

FOREIGN PATENT DOCUMENTS

| EP | 1 156 573 A2 | 11/2001 |
| JP | 2 22035 | 2/1990 |
| JP | 2 303327 | 12/1990 |
| JP | 3 124228 | 5/1991 |
| JP | 4 51044 | 4/1992 |
| JP | 10-281577 A | 10/1998 |
| JP | 11 341701 | 12/1999 |
| JP | 11 341816 | 12/1999 |
| JP | 2001 327083 | 11/2001 |
| JP | 2002 44869 | 2/2002 |
| JP | 2004 23860 | 1/2004 |
| JP | 2006 187071 | 7/2006 |
| JP | 2008 228517 | 9/2008 |
| JP | 2008228517 A * | 9/2008 |
| KR | 1990-0005425 B1 | 7/1990 |
| KR | 10-0701886 B1 | 4/2007 |
| WO | 2005 015727 | 2/2005 |

OTHER PUBLICATIONS

International Search Report Issued Dec. 8, 2009 in PCT/JP09/66182.
Combined Chinese Office Action and Search Report issued Dec. 3, 2013, in Chinese Patent Application No. 201080037033.3 with English translation.
Office Action issued Feb. 4, 2014, in Japanese Patent Application No. 2011-531820 with English translation.
Korean Office Action issued Jan. 15, 2013 in Patent Application No. 10-2012-7004557 with English Translation.

\* cited by examiner

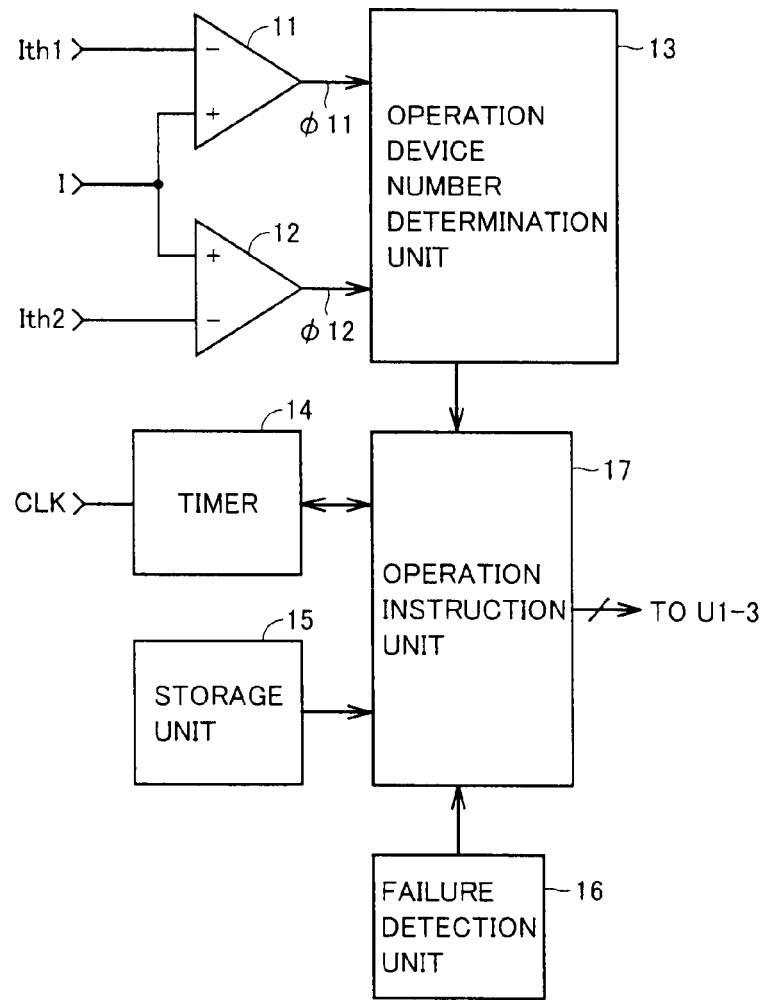

|  | T1 | T2 | T3 | T4 |  |  |
|---|---|---|---|---|---|---|
| OPERATE ONE DEVICE { | U1 | U2 | U3 | U4 | } OPERATE TWO DEVICES | } OPERATE THREE DEVICES |
|  | U2 | U3 | U4 | U1 |  |  |
|  | U3 | U4 | U1 | U2 |  |  |
|  | U4 | U1 | U2 | U3 |  |  |

… (1)

POWER CONVERSION SYSTEM AND UNINTERRUPTIBLE POWER SUPPLY SYSTEM

TECHNICAL FIELD

The present invention relates to a power conversion system and an uninterruptible power supply system, and particularly to a power conversion system including a plurality of power conversion devices connected in parallel and an uninterruptible power supply system.

BACKGROUND ART

Conventionally, there is a known uninterruptible power supply system which drives a load by a plurality of uninterruptible power supply devices connected in parallel. In the conventional first uninterruptible power supply system, a load current is equally shared among all of the uninterruptible power supply devices to drive a load. In this system, even when a failure occurs in one uninterruptible power supply device, the load can be driven by the remaining uninterruptible power supply devices.

Furthermore, for example, as disclosed in Japanese Patent Laying-Open No. 03-124228 (Patent Literature 1) and Japanese Utility Model Laying-Open No. 04-51044 (Patent Literature 2), in the conventional second uninterruptible power supply system, the number of uninterruptible power supply devices to be operated is changed in accordance with the load current.

CITATION LIST

Patent Literature

PTL 1: Japanese Patent Laying-Open No. 03-124228
PTL 2: Japanese Utility Model Laying-Open No. 04-51044

SUMMARY OF INVENTION

Technical Problem

However, the first uninterruptible power supply system poses a problem that a loss occurs in each of the plurality of uninterruptible power supply devices, which leads to reduced efficiency.

In the second uninterruptible power supply system, for example, when the number of uninterruptible power supply devices to be operated is one, the uninterruptible power supply device that is operated is fixed. Accordingly, only part of the plurality of uninterruptible power supply devices is continuously operated, which tends to cause a failure to occur in the uninterruptible power supply device that is continuously operated.

Furthermore, it cannot be determined whether a failure occurs or not in the uninterruptible power supply device unless the uninterruptible power supply device is actually operated. Accordingly, in the case where there is an uninterruptible power supply device suffering a failure while being left unoperated for a long period of time, there is also a problem that detection of the failure is delayed.

Therefore, a main purpose of the present invention is to provide a power conversion system and an uninterruptible power supply system that are highly efficient, less likely to suffer a failure and capable of immediately detecting a failure.

Solution to Problem

A power conversion system according to the present invention includes a plurality of power conversion devices connected in parallel between a power supply and a load, the plurality of power conversion devices each converting first power supplied from the power supply into second power and supplying the second power to the load; and a control unit selecting a required number of power conversion devices for converting the first power into the second power from the plurality of power conversion devices, to cause each of selected power conversion devices to be operated and to cause each of remaining power conversion devices to be stopped. This control unit changes the power conversion devices to be operated in a predetermined cycle such that the plurality of power conversion devices are identical in operation time to one another.

Furthermore, an uninterruptible power supply system according to the present invention includes a plurality of uninterruptible power supply devices connected in parallel between a commercial alternating-current (AC) power supply and a load. Each of the uninterruptible power supply devices includes a converter converting first AC power supplied from the commercial AC power supply into direct-current (DC) power; and an inverter converting the DC power into second AC power. The uninterruptible power supply system further includes a control unit selecting a required number of inverters for driving the load from a plurality of inverters, to cause each selected inverter to be operated and to cause each remaining inverter to be stopped. This control unit changes the inverters to be operated in a predetermined cycle such that the plurality of inverters are identical in operation time to one another.

Furthermore, another uninterruptible power supply system according to the present invention further includes a plurality of uninterruptible power supply devices connected in parallel between a commercial AC power supply and a load; and a power storage device provided in common among the plurality of uninterruptible power supply devices and storing DC power. Each of the uninterruptible power supply devices includes a converter converting first AC power supplied from the commercial AC power supply into DC power; and an inverter converting the DC power supplied from the converter or the power storage device into second AC power. The power storage device stores the DC power generated in the converter of each of the plurality of uninterruptible power supply devices. The uninterruptible power supply system further includes a control unit selecting a required number of converters for driving the load from the plurality of converters, to cause each selected converter to be operated and to cause each remaining converter to be stopped. This control unit changes the converters to be operated in a predetermined cycle such that the plurality of converters are identical in operation time to one another.

Furthermore, still another uninterruptible power supply system according to the present invention further includes a plurality of uninterruptible power supply devices; and a power storage device provided in common among the plurality of uninterruptible power supply devices and storing DC power. The plurality of uninterruptible power supply devices have input nodes each connected to a commercial AC power supply and output nodes connected to a plurality of loads, respectively. Each of the uninterruptible power supply devices includes a converter converting first AC power supplied from the commercial AC power supply into DC power, and an inverter converting the DC power supplied from the converter or the power storage device into second AC power. The power storage device stores the DC power generated in the converter of each of the plurality of uninterruptible power supply devices. The uninterruptible power supply system further includes a control unit selecting a required number of converters for driving the plurality of loads from the plurality of converters, to cause each selected converter to be operated and to cause each remaining converter to be stopped. This control unit changes the converters to be operated in a predetermined cycle such that the plurality of converters are identical in operation time to one another.

Furthermore, still another uninterruptible power supply system according to the present invention further includes a switch having one terminal receiving AC power from a commercial AC power supply and the other terminal connected to a load, brought into conduction at a time of a normal operation during which the AC power is supplied from the commercial AC power supply, and brought out of conduction at a time of interruption during which the commercial AC power supply stops supplying the AC power; a plurality of power conversion devices connected in parallel to the other terminal of the switch, and each converting the AC power supplied from the commercial AC power supply via the switch into DC power and supplying the DC power to a power storage device at the time of the normal operation, and converting the DC power in the power storage device into the AC power and supplying the AC power to the load at the time of interruption; and a control unit selecting a required number of power conversion devices for driving the load from the plurality of power conversion devices, to cause each of selected power conversion devices to be operated and to cause each of remaining power conversion devices to be stopped. This control unit changes the power conversion devices to be operated in a predetermined cycle such that the plurality of power conversion devices are identical in operation time to one another.

Advantageous Effects of Invention

As described above, the power conversion system according to the present invention is provided with a control unit selecting the required number of power conversion devices for converting the first power into the second power, to cause each selected power conversion device to be operated and to cause each remaining power conversion device to be stopped. This control unit changes the power conversion devices to be operated from one to another in a predetermined cycle such that the plurality of power conversion devices are identical in operation time to one another. Consequently, the continuous operation time of each power conversion device can be shortened, and thus, failures occurring in each power conversion device can be reduced. Furthermore, it becomes also possible to immediately find the power conversion device suffering a failure while it is stopped. Furthermore, the number of power conversion devices to be operated is changed in accordance with the load current, so that the efficiency can be increased.

Furthermore, another uninterruptible power supply system according to the present invention is provided with a control unit selecting the required number of inverters for driving the load from the plurality of inverters, to cause each selected inverter to be operated and to cause each remaining inverter to be stopped. This control unit changes the inverters to be operated from one to another in a predetermined cycle such that the plurality of inverters are identical in operation time to one another. Consequently, the continuous operation time of each inverter can be shortened, and thus, failures occurring in each inverter can be reduced. Furthermore, it becomes also possible to immediately find the inverter suffering a failure while it is stopped. Furthermore, the number of inverters to be operated is changed in accordance with the load current, so that the efficiency can be increased.

Furthermore, still another uninterruptible power supply system according to the present invention is provided with a control unit selecting the required number of converters for driving the load from the plurality of converters, to cause each selected converter to be operated and to cause each remaining converter to be stopped. This control unit changes the converters to be operated from one to another in a predetermined cycle such that the plurality of converters are identical in operation time to one another. Consequently, the continuous operation time of each converter can be shortened, and thus, failures occurring in each converter can be reduced. Furthermore, it becomes also possible to immediately find a converter suffering a failure while it is stopped. Furthermore, the number of converters to be operated is changed in accordance with the load current, so that the efficiency can be increased.

Furthermore, still another uninterruptible power supply system according to the present invention is provided with a control unit selecting the required number of power conversion devices for driving the load from the plurality of power conversion devices, to cause each selected power conversion device to be operated and to cause each remaining power conversion device to be stopped. This control unit changes the power conversion devices to be operated from one to another in a predetermined cycle such that the plurality of power conversion devices are identical in operation time to one another. Consequently, the continuous operation time of each power conversion device can be shortened, and thus, failures occurring in each power conversion device can be reduced. Furthermore, it becomes also possible to immediately find a power conversion device suffering a failure while it is stopped. Furthermore, the number of power conversion devices to be operated is changed in accordance with the load current, so that the efficiency can be increased.

BRIEF DESCRIPTION OF DRAWINGS

FIG. 2 is a circuit block diagram showing the configuration of a control unit shown in FIG. 1.

FIG. 3 is a diagram showing a table stored in a storage unit shown in FIG. 2.

DESCRIPTION OF EMBODIMENTS

First Embodiment

Figure 1:
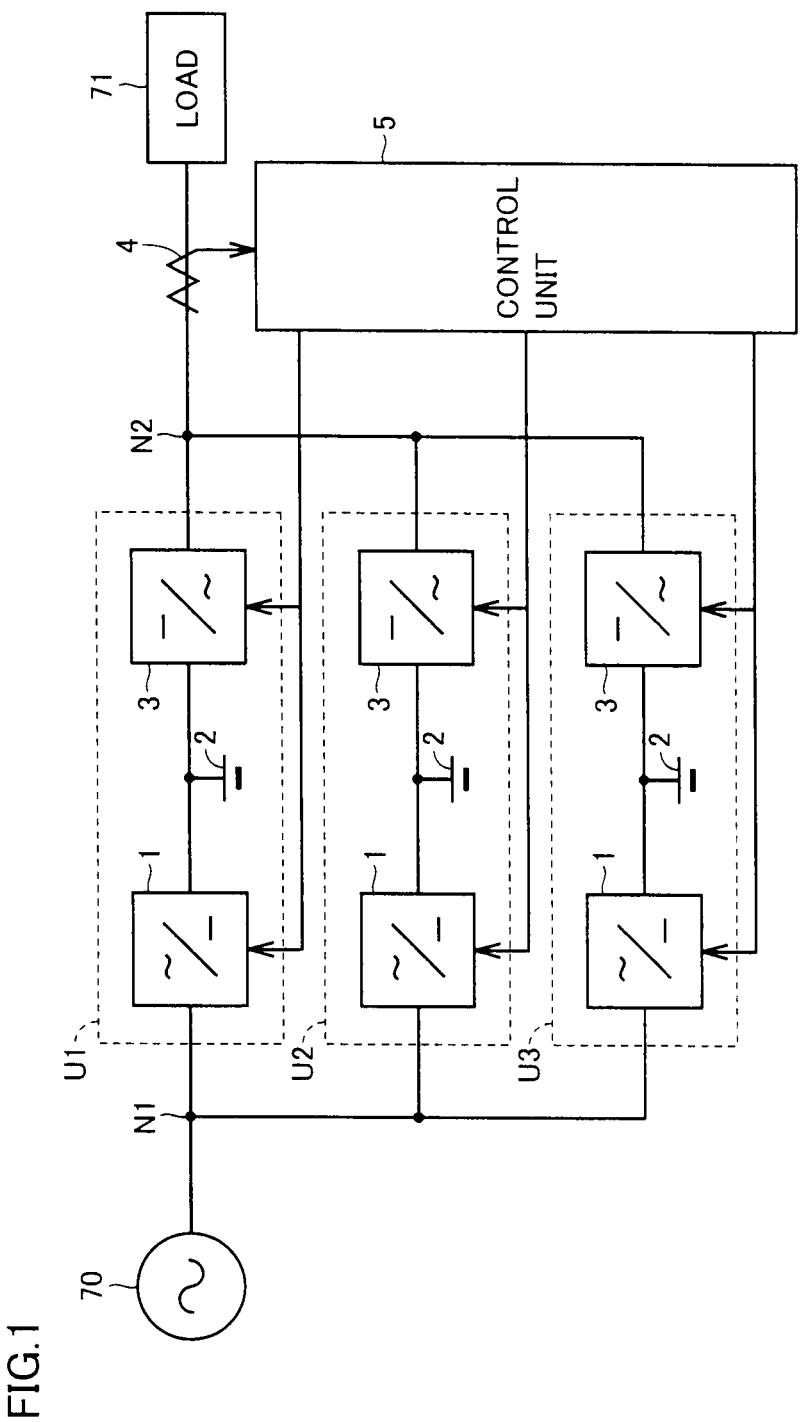
FIG. 1 is a circuit block diagram showing the configuration of an uninterruptible power supply system according to the first embodiment of the present invention.

The uninterruptible power supply system according to the first embodiment includes a plurality of (three in the figure) uninterruptible power supply devices U1 to U3, a current sensor 4 and a control unit 5, as shown in FIG. 1. Uninterruptible power supply devices U1 to U3 are connected in parallel between a commercial AC power supply 70 and a load 71. Each of uninterruptible power supply devices U1 to U3 includes a converter 1, a battery 2 and an inverter 3. Three converters 1 each have an input node connected in common to a node N1 which is connected to commercial AC power supply 70. Converter 1 converts the commercial AC power from commercial AC power supply 70 into DC power. Battery 2 stores the DC power generated in converter 1. Inverter 3 converts the DC power supplied from converter 1 or battery 2 into AC power. Three inverters 3 each have an output node connected in common to a node N2. Node N2 is connected to load 71.

When the AC power is supplied from commercial AC power supply 70, the DC power generated in converter 1 is stored in battery 2 and supplied to inverter 3, and the AC power generated in inverter 3 is supplied to load 71. When commercial AC power supply 70 stops supplying the AC power (at the time of interruption), converter 1 is stopped, the DC power stored in battery 2 is supplied to inverter 3, and the AC power generated in inverter 3 is supplied to load 71. Therefore, load 71 can be driven even at the time of interruption as long as the DC power is stored in battery 2.

Current sensor 4 detects the current flowing from node N2 into load 71, and supplies a signal indicating the detected current value to control unit 5. Based on the output signal of current sensor 4, control unit 5 obtains the required number (for example, one) of uninterruptible power supply devices for driving load 71, to cause only the corresponding number of uninterruptible power supply devices (for example, U1) to be operated and to cause the remaining uninterruptible power supply devices (in this case, U2 and U3) to be stopped.

Furthermore, control unit 5 changes the uninterruptible power supply devices to be operated from one to another in a predetermined cycle such that the plurality of uninterruptible power supply devices U1 to U3 are identical in operation time to one another. For example, control unit 5 changes the uninterruptible power supply devices to be operated from one to another in a one-day cycle, to cause three uninterruptible power supply devices U1 to U3 to be operated sequentially one by one. In addition, control unit 5 may be included in the control unit (not shown) of each of uninterruptible power supply devices U1 to U3, to cause control unit 5 of one uninterruptible power supply device to control three uninterruptible power supply devices U1 to U3.

As shown in FIG. 2, control unit 5 includes comparison circuits 11 and 12, an operation device number determination unit 13, a timer 14, a storage unit 15, a failure detection unit 16, and an operation instruction unit 17. Comparison circuit 11 compares the high/low level between a load current I detected by current sensor 4 and a threshold current Ith1 corresponding to 33% of the rated current. An output signal φ11 from comparison circuit 11 is brought into an "L" level when load current I is lower than threshold current Ith1 and is brought into an "H" level when load current I is higher than threshold current Ith1.

Comparison circuit 12 compares the high/low level between load current I detected by current sensor 4 and threshold current Ith1 corresponding to 66% of the rated current. An output signal φ12 from comparison circuit 12 is brought into an "L" level when load current I is lower than a threshold current Ith2 and is brought into an "H" level when load current I is higher than threshold current Ith2.

Based on output signals φ11 and φ12 of comparison circuits 11 and 12, respectively, operation device number determination unit 13 determines the number of uninterruptible power supply devices to be operated. In the case where signals φ11 and φ12 each are in the "L" level, load current I is less than 33% of the rated current. Accordingly, the number of uninterruptible power supply devices to be operated is determined to be one. Furthermore, in the case where signals φ11 and φ12 are in the "H" level and the "L" level, respectively, load current I is greater than 33% of the rated current and less than 66% of the rated current. Accordingly, the number of uninterruptible power supply devices to be operated is determined to be two. Furthermore, in the case where signals φ11 and φ12 each are in the "H" level, load current I is greater than 66% of the rated current. Accordingly, the number of uninterruptible power supply devices to be operated is determined to be three.

Timer 14 includes a counter which counts the pulse number of a clock signal CLK. When the count values of the counter are 0, 1 and 2, timer 14 outputs signals indicating corresponding time periods T1, T2 and T3. When a pulse of clock signal CLK is input in the case where the count value of the counter is 2, the count value of the counter is returned to 0.

Storage unit 2 stores the table shown in FIG. 3. The uppermost row of the table shows time periods T1, T2 and T3. The second row from above shows U1, U2 and U3 which are the numbers of the uninterruptible power supply devices operated in time periods T1, T2 and T3, respectively, when the number of devices to be operated is one. Furthermore, the third row shows U2, U3 and U1 which are the numbers each indicating the other uninterruptible power supply device that is operated in time periods T1, T2 and T3, respectively, when the number of devices to be operated is two. The fourth row shows U3, U1 and U2 which are the numbers each indicating another one of uninterruptible power supply devices that is operated in time periods T1, T2 and T3, respectively, when the number of devices to be operated is three.

Operation instruction unit 17 refers to the table stored in storage unit 15 to cause the uninterruptible power supply devices to be operated, the number of which is determined by operation device number determination unit 13. In other words, when operation device number determination unit 13 determines that the number of devices to be operated is one, operation instruction unit 17 causes uninterruptible power supply devices U1 to U3 to be operated in time periods T1 to T3, respectively, indicated by the output signal of timer 14. Furthermore, when operation device number determination unit 13 determines that the number of devices to be operated is two, operation instruction unit 17 causes uninterruptible power supply devices U1 and U2, U2 and U3, and U3 and U1 to be operated in time periods T1, T2 and T3, respectively, indicated by the output signal of timer 14. Furthermore, when operation device number determination unit 13 determines that the number of devices to be operated is three, operation instruction unit 17 causes three uninterruptible power supply devices U1 to U3 to be operated irrespective of time periods T1 to T3 indicated by the output signal of timer 14.

Furthermore, also when the number of devices to be operated is changed by operation device number determination unit 13 in a certain time period, operation instruction unit 17 causes the uninterruptible power supply devices to be operated in accordance with the table in FIG. 3. For example, when the number of devices to be operated is changed from three to two in time period T1, uninterruptible power supply device U3 of three uninterruptible power supply devices U1 to U3 that are operated is stopped. Furthermore, when the number of devices to be operated is changed from one to two in time period T2, uninterruptible power supply device U3 is operated in addition to uninterruptible power supply device U2 that is being operated.

Furthermore, failure detection unit 16 detects whether or not a failure occurs in each of uninterruptible power supply devices U1 to U3, and supplies the signal indicating the detection results to operation instruction unit 17. For example, when failure detection unit 16 detects a failure occurring in one uninterruptible power supply device (for example, U1) and operation device number determination unit 13 determines that the number of devices to be operated is one, the remaining two uninterruptible power supply devices (in this case, U2 and U3) are alternately operated in a predetermined cycle, irrespective of the output signal from timer 14. Furthermore, when failure detection unit 16 detects a failure in one uninterruptible power supply device (for example, U1) and operation device number determination unit 13 determines that number of devices to be operated is two, two uninterruptible power supply devices (in this case, U2 and U3) are operated irrespective of the output signal from timer 14.

Figures 4, 5:
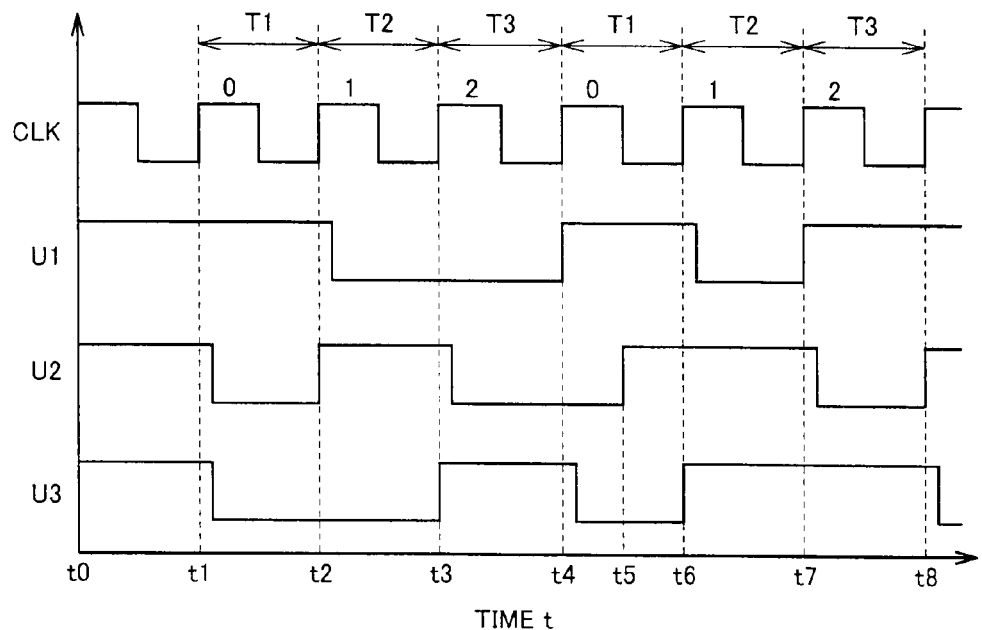
FIG. 4 is a time chart illustrating the operation of the uninterruptible power supply system shown in FIG. 1.
FIG. 5 is a diagram showing a modification of the first embodiment.

FIG. 4 is a time chart illustrating the operation of this uninterruptible power supply system. At time t0, the operation of each of three uninterruptible power supply devices U1 to U3 is started, and load current I is detected. Load current I is compared with each of threshold currents Ith1 and Ith2. Based on the comparison results, the number of uninterruptible power supply devices to be operated is determined. In this case, the number of uninterruptible power supply devices to be operated is determined to be one.

At time t1, the count value of the counter within timer 14 is reset to 0, and the signal indicating time period T1 is output from timer 14. Operation instruction unit 17 refers to the table in FIG. 3 to causes only uninterruptible power supply device U1 to be operated and to cause remaining uninterruptible power supply devices U2 and U3 to be stopped.

At time t2, the count value of the counter within timer 14 is incremented (+1) to 1, and the signal indicating time period T2 is output from timer 14. Operation instruction unit 17 refers to the table in FIG. 3 to cause uninterruptible power supply device U2 to be operated, and then, causes remaining uninterruptible power supply devices U3 and U1 to be stopped.

At time t3, the count value of the counter within timer 14 is incremented (+1) to 2, and the signal indicating time period T3 is output from timer 14. Operation instruction unit 17 refers to the table in FIG. 3 to cause uninterruptible power supply device U3 to be operated, and then, causes remaining uninterruptible power supply devices U1 and U2 to be stopped.

At time t4, the count value of the counter within timer 14 is reset to 0, and the signal indicating time period T1 is output from timer 14. Operation instruction unit 17 refers to the table in FIG. 3 to cause uninterruptible power supply device U1 to be operated, and then, causes remaining uninterruptible power supply devices U2 and U3 to be stopped.

Then, load current I is increased, and operation device number determination unit 13 determines that the number of devices to be operated is two. At time t5, operation instruction unit 17 refers to the table in FIG. 3 to start the operation of uninterruptible power supply device U2, in addition to uninterruptible power supply device U1.

At time t6, the count value of the counter within timer 14 is incremented (+1) to 1, and the signal indicating time period T2 is output from timer 14. Operation instruction unit 17 refers to the table in FIG. 3 to cause uninterruptible power supply devices U2 and U3 to be operated, and then, causes remaining uninterruptible power supply device U1 to be stopped.

At time t7, the count value of the counter within timer 14 is incremented (+1) to 2, and the signal indicating time period T3 is output from timer 14. Operation instruction unit 17 refers to the table in FIG. 3 to cause uninterruptible power supply devices U3 and U1 to be operated, and then, causes remaining uninterruptible power supply device U2 to be stopped.

In this first embodiment, the required number of uninterruptible power supply devices for driving load 71 is selected from three uninterruptible power supply devices U1 to U3, to cause each selected uninterruptible power supply device to be operated and to cause each remaining uninterruptible power supply device to be stopped. Therefore, as compared with the case where all of uninterruptible power supply devices U1 to U3 are operated irrespective of the load current, the loss occurring in each of uninterruptible power supply devices U1 to U3 can be reduced, and thus, the efficiency can be improved.

Furthermore, the uninterruptible power supply devices to be operated are changed from one to another in a predetermined cycle such that three uninterruptible power supply devices U1 to U3 are identical in operation time to one another. Consequently, the continuous operation time of each of the uninterruptible power supply devices can be shortened, and thus, failures occurring in each uninterruptible power supply device can be reduced. Furthermore, it becomes also possible to immediately find an uninterruptible power supply device suffering a failure while it is stopped.

[Modification 1]

Although an explanation has been made in the above embodiment with regard to the case where three uninterruptible power supply devices U1 to U3 are provided, the same applies to the case where four or more uninterruptible power supply devices are provided. For example, when four uninterruptible power supply devices U1 to U4 are provided, timer 14 includes a counter which counts the pulse number of clock signal CLK. When the count values of the counter are 0, 1, 2, and 3, timer 14 outputs the signals indicating time periods T1, T2, T3, and T4, respectively. When a pulse of clock signal CLK is input in the case where the count value of the counter is 3, the count value of the counter is returned to 0.

Storage unit 2 stores the table shown in FIG. 5. The uppermost row of the table shows time periods T1, T2, T3, and T4.

The second row from above shows U1, U2, U3, and U4 which are the numbers of the uninterruptible power supply devices operated in time periods T1, T2, T3, and T4, respectively, when the number of devices to be operated is one. Furthermore, the third row shows U2, U3, U4, and U1 which are the numbers each indicating the other uninterruptible power supply device that is operated in time periods T1, T2, T3, and T4, respectively, when the number of devices to be operated is two. The fourth row shows U3, U4, U1 and U2 which are the numbers each indicating another one of the uninterruptible power supply devices that is operated in time periods T1, T2, T3, and T4, respectively, when the number of devices to be operated is three. The fifth row shows U4, U1, U2, and U3 which are the numbers each indicating another one of the uninterruptible power supply devices that is operated in time periods T1, T2, T3, and T4, respectively, when the number of devices to be operated is four.

When operation device number determination unit 13 determines that the number of devices to be operated is one, operation instruction unit 17 causes uninterruptible power supply devices U1 to U4 to be operated in time periods T1 to T4, respectively, indicated by the output signal from timer 14. Furthermore, when operation device number determination unit 13 determines that the number of devices to be operated is two, operation instruction unit 17 causes uninterruptible power supply devices U1 and U2, U2 and U3, U3 and U4, and U4 and U1 to be operated in time periods T1, T2, T3, and T4, respectively, indicated by the output signal from timer 14.

Furthermore, when operation device number determination unit 13 determines that the number of devices to be operated is three, operation instruction unit 17 causes uninterruptible power supply devices U1, U2 and U3, U2, U3 and U4, U3, U4 and U1, and U4, U1 and U2 to be operated in time periods T1, T2, T3, and T4, respectively, indicated by the output signal from timer 14. Furthermore, when operation device number determination unit 13 determines that the number of devices to be operated is four, operation instruction unit 17 causes four uninterruptible power supply devices U1 to U4 to be operated irrespective of time periods T1 to T4 indicated by the output signal from timer 14.

Furthermore, storage unit 1 also stores the table in the case where a failure occurs in one uninterruptible power supply device. For example, the table in FIG. 3 is stored as a table in the case where a failure occurs in uninterruptible power supply device U4. In this case, timer 14 outputs the signal indicating time periods T1 to T3 in place of the signal indicating time periods T1 to T4, and thus, the same operation as that in the system shown in each of FIGS. 1 to 4 is performed. The same effect as that in the embodiment can also be achieved in this Modification 1.

[Modification 2]

In the above-described first embodiment, the required minimum number of uninterruptible power supply devices for driving load 71 is operated. In addition to this, in Modification 2, a spare uninterruptible power supply device is operated to perform the so-called redundancy operation. Operation instruction unit 17 causes the uninterruptible power supply devices to be operated, the number of which is equal to the number obtained by adding one to the number of uninterruptible power supply devices determined by operation device number determination unit 13. For example, when load current I is lower than 33% of the rated current, only one uninterruptible power supply device is operated in the above-described first embodiment whereas two uninterruptible power supply devices are operated in this modification. In this case, even when a failure suddenly occurs in one uninterruptible power supply device during the operation, load 71 can be driven by the other uninterruptible power supply device. The rotation of the uninterruptible power supply devices to be operated is the same as that in the first embodiment.

[Modification 3]

In the above-described first embodiment, the required number of uninterruptible power supply devices for driving load 71 is selected in accordance with load current I, to cause each selected uninterruptible power supply device to be operated and to cause each remaining uninterruptible power supply device to be stopped. Also, the uninterruptible power supply devices to be operated are changed from one to another in a predetermined cycle such that three uninterruptible power supply devices U1 to U3 are identical in operation time to one another. However, when battery 2 is, for example, a lead-acid battery, battery 2 should be continuously charged. Thus, in this Modification 3, irrespective of load current I, converter 1 of each of three uninterruptible power supply devices U1 to U3 is continuously operated to continuously charge three batteries 2. Furthermore, the required number of inverters 3 for driving load 71 is selected in accordance with load current I, to cause each selected inverter 3 to be operated and to cause each remaining inverter 3 to be stopped. Also, inverters 3 to be operated are changed from one to another in a predetermined cycle such that three inverters 3 are identical in operation time to one another. The rotation of inverters 3 to be operated is the same as that in the first embodiment. In this Modification 3, failures occurring in inverter 3 can be reduced. In addition, when battery 2 is, for example, a lithium ion battery, battery 2 does not need to be continuously charged.

[Modification 4]

Figure 6:
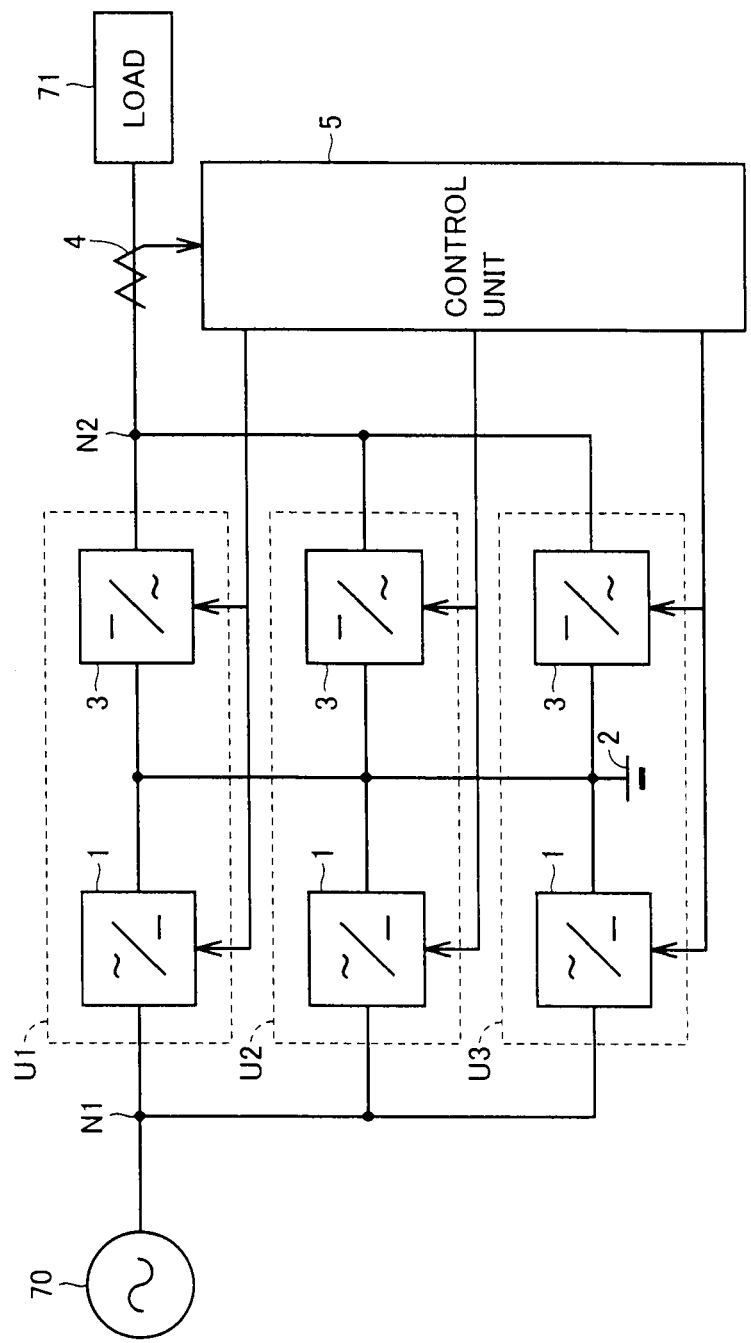
FIG. 6 is a circuit block diagram showing another modification of the first embodiment.

In this Modification 4, as shown in FIG. 6, one battery 2 is shared among three uninterruptible power supply devices U1 to U3. Three converters 1 each charge one battery 2 which then supplies DC power to three inverters 3. In this Modification 4, when one uninterruptible power supply device is operated, battery 2 can be continuously charged. Therefore, even when battery 2 is a lead-acid battery that needs to be continuously charged, the uninterruptible power supply devices provided in number in accordance with load current I can be operated.

[Modification 5]

Figure 7:
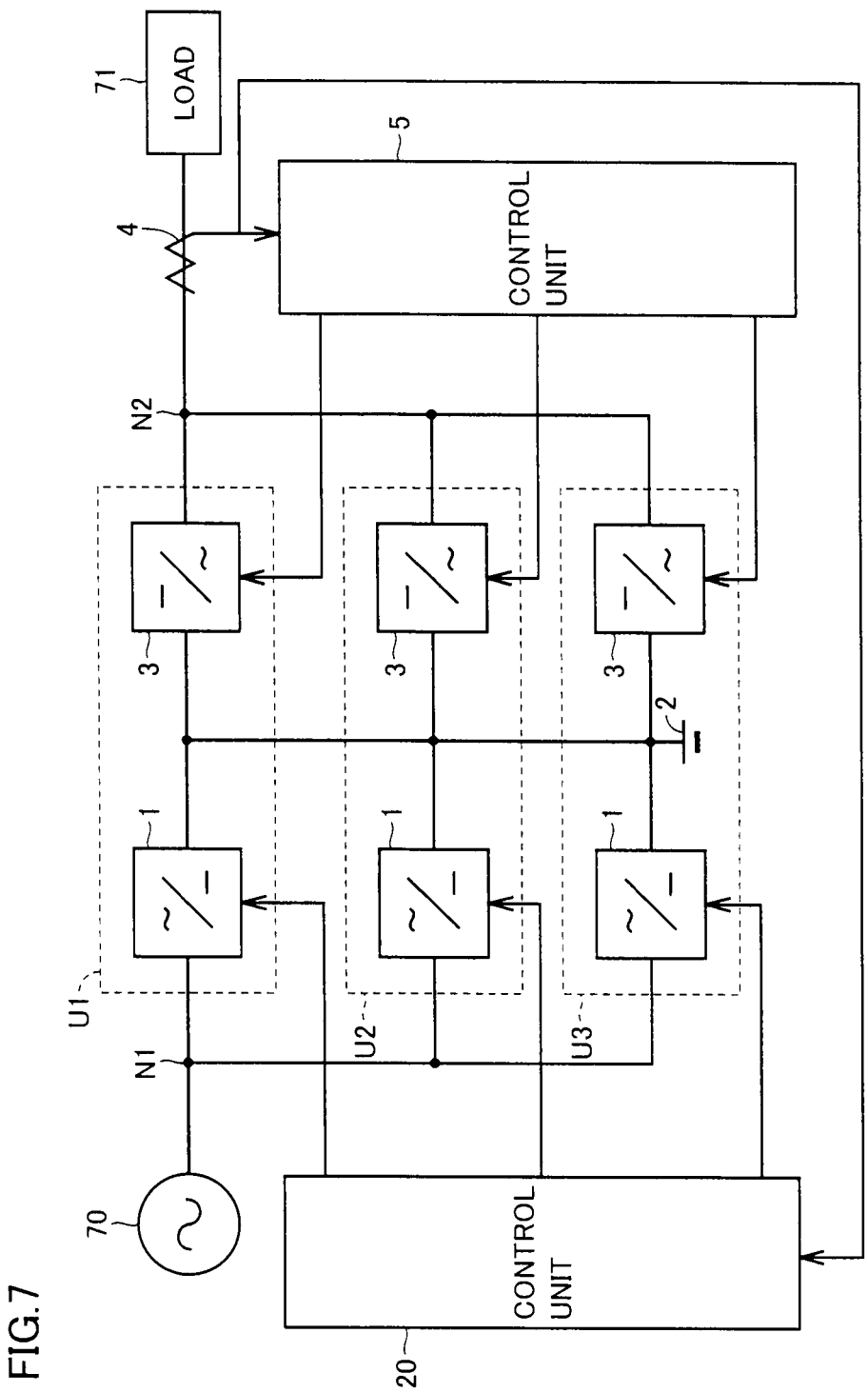
FIG. 7 is a circuit block diagram showing still another modification of the first embodiment.

In Modification 5, as shown in FIG. 7, a control unit 20 is added to Modification 4. Control unit 20 is identical in configuration to control unit 5. Control unit 5 controls three inverters 3 to be operated/stopped while control unit 20 controls three converters 1 to be operated/stopped. In other words, control unit 5 selects the required number of inverters 3 for driving load 71 in accordance with load current I, to cause each selected inverter 3 to be operated and to cause each remaining inverter 3 to be stopped. This control unit 5 also changes inverters 3 to be operated from one to another in a predetermined cycle such that three inverters 3 are identical in operation time to one another. Furthermore, when a failure occurs in one inverter 3, control unit 5 controls remaining two inverters 3 to be operated/stopped, and changes inverters 3 to be operated from one to another in a predetermined cycle such that remaining two inverters 3 are identical in operation time to each other.

Similarly, control unit 20 selects the required number of converters 1 for driving load 71 in accordance with load current I, to cause each selected converter 1 to be operated and to cause each remaining converter 1 to be stopped. This control unit 20 also changes converters 1 to be operated from one to another in a predetermined cycle such that three converters 1 are identical in operation time to one another. Furthermore, when a failure occurs in one converter 1, control unit 20 controls remaining two converters 1 to be operated/stopped, and changes converters 1 to be operated from one to another in a predetermined cycle such that two converters 1 are identical in operation time to each other. The rotation of converters 1 to be operated is the same as that in the first embodiment. The same effect as that in the embodiment can also be achieved in this Modification 5.

[Modification 6]

Figure 8:
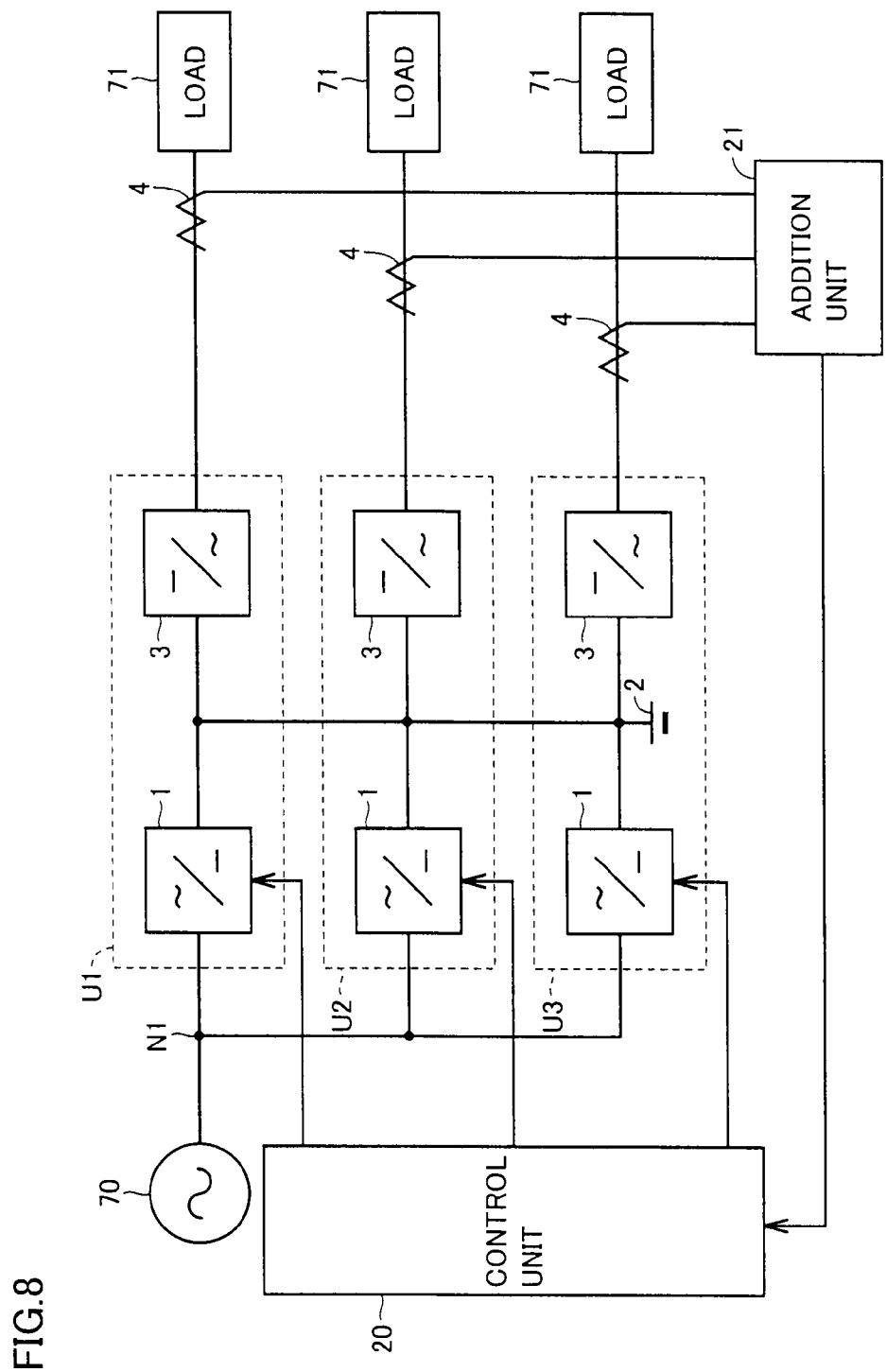
FIG. 8 is a circuit block diagram showing still another modification of the first embodiment.

In Modification 6, as shown in FIG. 8, load 71 and current sensor 4 are connected to each of three uninterruptible power supply devices U1 to U3. Three current sensors 4 detect load currents I1 to I3 of uninterruptible power supply devices U1 to U3, respectively, and output the signals indicating the detection values of load currents I1 to I3, respectively. An addition unit 21 adds the output signals of three current sensors 4, and supplies the signal indicating a current IA of the sum of load currents I1 to I3 of three uninterruptible power supply devices U1 to U3 to control unit 20. Control unit 20 selects the required number of converters 1 for driving three loads 71 in accordance with current IA, to cause each selected converter 1 to be operated and to cause each remaining converter 1 to be stopped. Control unit 20 also changes converters 1 to be operated from one to another in a predetermined cycle such that three converters 1 are identical in operation time to one another. Furthermore, when a failure occurs in one converter 1, control unit 20 controls remaining two converters 1 to be operated/stopped, and changes converters 1 to be operated from one to another in a predetermined cycle such that two converters 1 are identical in operation time to each other. In this Modification 6, failures occurring in converter 1 can be reduced.

[Modification 7]

When load 71 is a server of a computer network, an increasing/decreasing amount of the load current is small. In this case, it is preferably to provide a setting unit for setting the rate (%) of the load current with respect to the rated current in place of current sensor 4. For example, in the case where the rate of the load current with respect to the rated current is set at 30%, control unit 5 causes three uninterruptible power supply devices U1 to U3 to be operated sequentially one by one. Then, in the case where a server is added and the rate of the load current with respect to the rated current is set at 60%, control unit 5 causes three uninterruptible power supply devices U1 to U3 to be operated sequentially two by two. The same effect as that in the first embodiment can be achieved also in this Modification 7.

[Modification 8]

In the above-described Modification 2, in addition to the required minimum number of uninterruptible power supply devices for driving load 71, a spare uninterruptible power supply device is operated to perform the so-called redundancy operation. However, even in the case where load current I is 50% of the rated current, when one uninterruptible power supply device can be sufficient for the operation for a relatively short period of time, the redundancy operation can be implemented by operating two uninterruptible power supply devices. In other words, even if a failure occurs in one uninterruptible power supply device U1 when two uninterruptible power supply devices U1 and U2 are operated in the case where load current I is 50% of the rated current, load 71 can be continuously operated by causing the other uninterruptible power supply device U2 to undergo the overload operation for the period of time until uninterruptible power supply device U3 that is being stopped is started. This allows the efficiency to be increased higher than the case where three uninterruptible power supply devices U1 to U3 are operated when load current I is 50% of the rated current.

[Modification 9]

Figure 9:
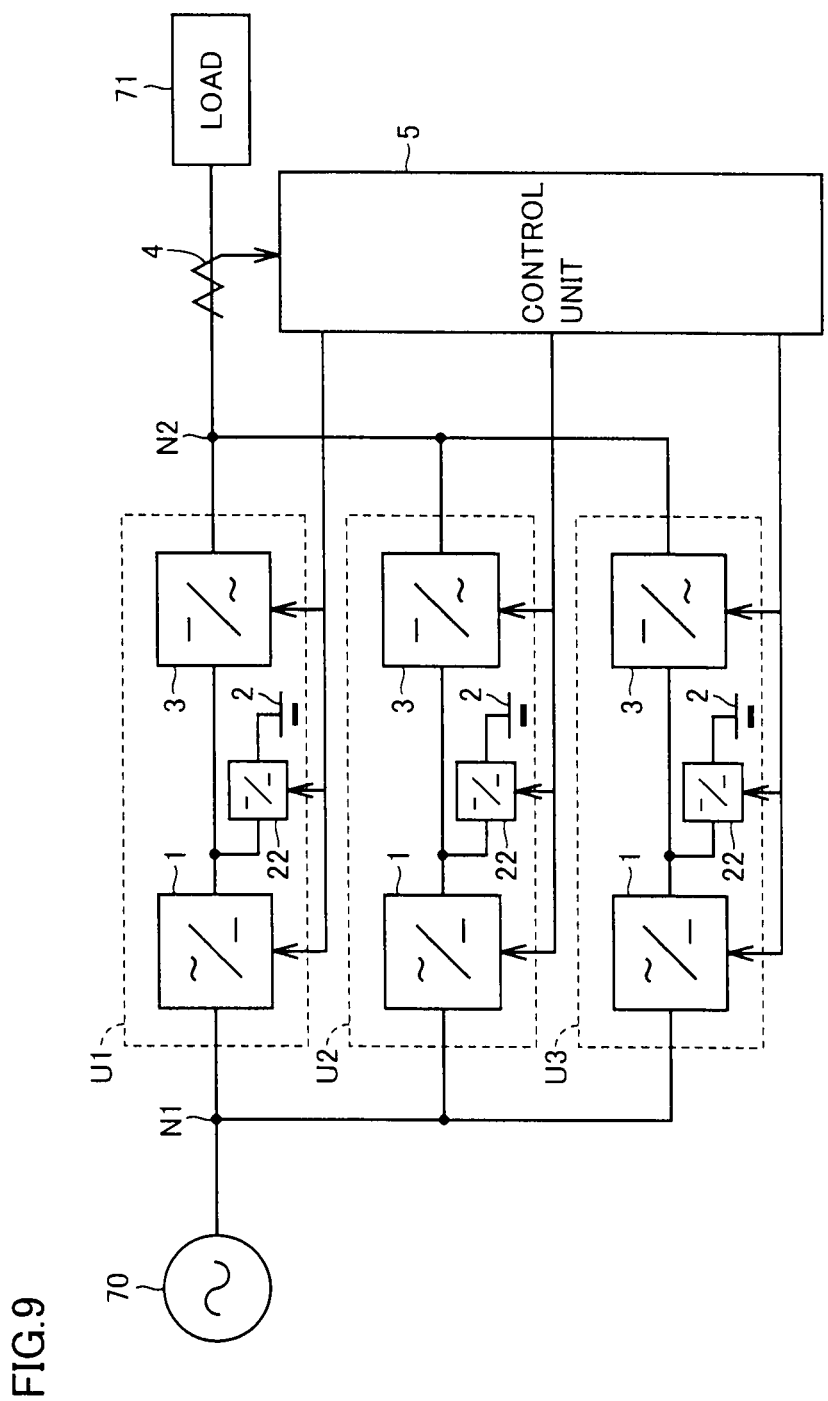
FIG. 9 is a circuit block diagram showing still another modification of the first embodiment.

FIG. 9 is a circuit block diagram showing Modification 9 of the first embodiment, and also shows a diagram compared with FIG. 1. Referring to FIG. 9, this Modification 9 is different from the first embodiment in that a bidirectional chopper 22 is added to each of uninterruptible power supply devices U1 to U3. When the AC power is supplied from commercial AC power supply 70, bidirectional chopper 22 converts the output voltage (first DC voltage) of converter 1 into a prescribed second DC voltage and supplies the second DC voltage to battery 2. When commercial AC power supply 70 stops supplying the AC power (at the time of interruption), bidirectional chopper 22 converts the output voltage (the second DC voltage) of battery 2 into a prescribed first DC voltage and supplies the first DC voltage to inverter 3.

In other words, when commercial AC power supply 70 supplies the AC power, the DC power generated in converter 1 is stored in battery 2 by bidirectional chopper 22 while the DC power generated in converter 1 is supplied to inverter 3 and the AC power generated in inverter 3 is supplied to load 71. Also, at the time of interruption, converter 1 is stopped, the DC power stored in battery 2 is supplied to inverter 3 by bidirectional chopper 22, and the AC power generated in inverter 3 is supplied to load 71. Therefore, load 71 can be driven even at the time of interruption during the time period while the DC power is stored in battery 2. The same effect as that in the first embodiment can be achieved also in this Modification 9.

[Modification 10]

Figure 10:
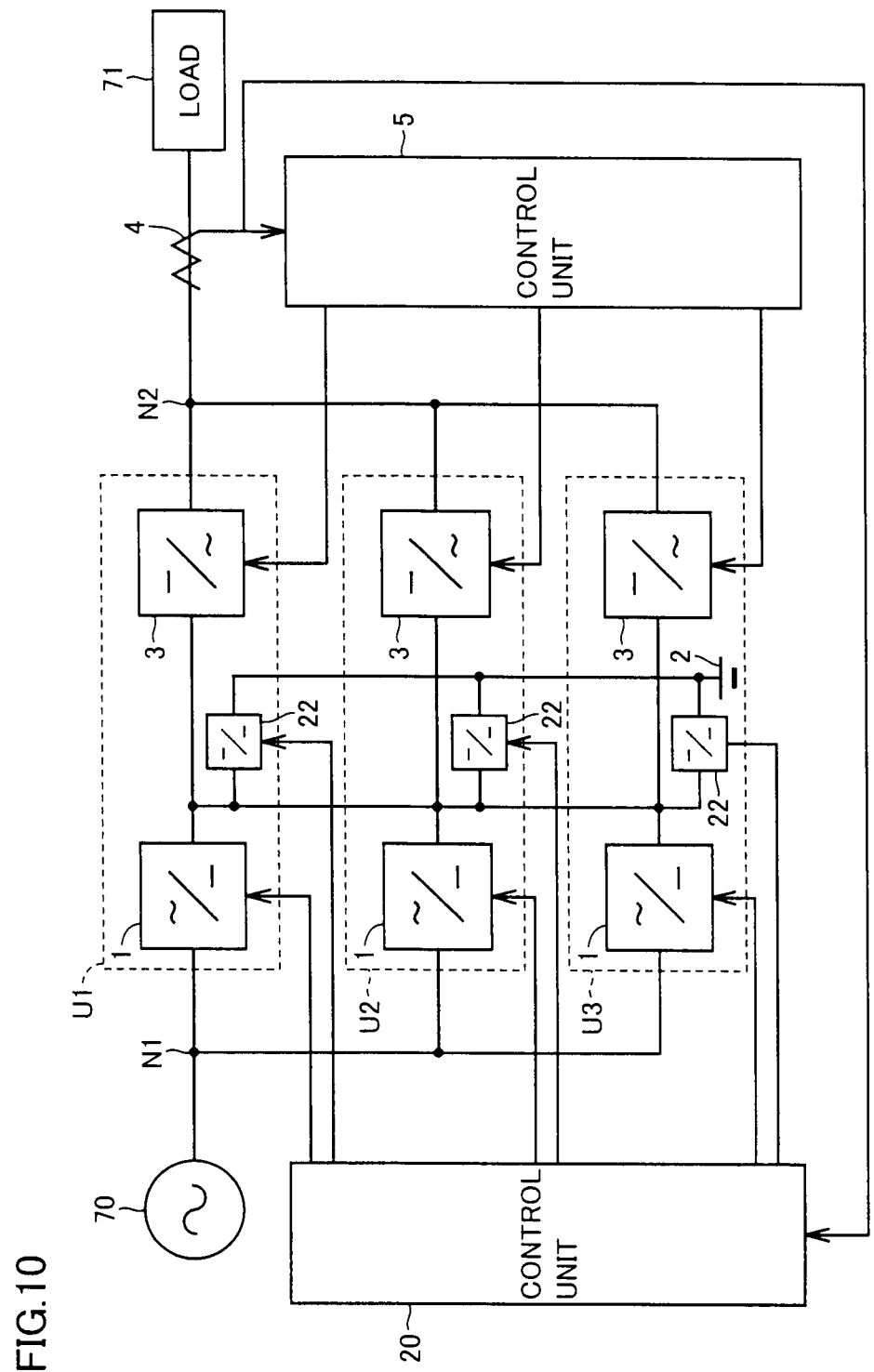
FIG. 10 is a circuit block diagram showing still another modification of the first embodiment.

FIG. 10 is a circuit block diagram showing Modification 10 of the first embodiment, and also shows a diagram compared with FIG. 7. Referring to FIG. 10, this Modification 10 is different from Modification 7 in that bidirectional chopper 22 is added to each of uninterruptible power supply devices U1 to U3. The output nodes of converters 1 of uninterruptible power supply devices U1 to U3 are connected to one another. Bidirectional choppers 22 each have an input node connected to the output node of the corresponding one of converters 1. Battery 2 has a positive electrode connected to the output node of each of bidirectional choppers 22. The operation of each of bidirectional choppers 22 is as described in Modification 9.

Control unit 5 controls three inverters 3 to be operated/stopped, control unit 20 controls three converters 1 to be operated/stopped, and control unit 30 also controls three bidirectional choppers 22 to be operated/stopped. The operation of control unit 5 is as described in Modification 7. The operation related to converter 1 of control unit 20 is as described in Modification 7.

Control unit 20 further selects the required number of bidirectional choppers 22 for driving load 71 based on load current I, to cause each selected bidirectional chopper 22 to be operated and to cause each remaining bidirectional chopper 22 to be stopped. Control unit 20 also changes bidirectional choppers 22 to be operated from one to another in a predetermined cycle such that three bidirectional choppers 22 are identical in operation time to one another. Furthermore, when a failure occurs in one bidirectional chopper 22, control unit 20 controls remaining two bidirectional choppers 22 to be operated/stopped, and changes bidirectional choppers 22 to be operated from one to another in a predetermined cycle such that two bidirectional choppers 22 are identical in operation time to each other. The rotation of bidirectional choppers 22 to be operated is the same as that in the first embodiment. The same effect as that in the first embodiment can be achieved also in this Modification 10.

[Modification 11]

Figure 11:
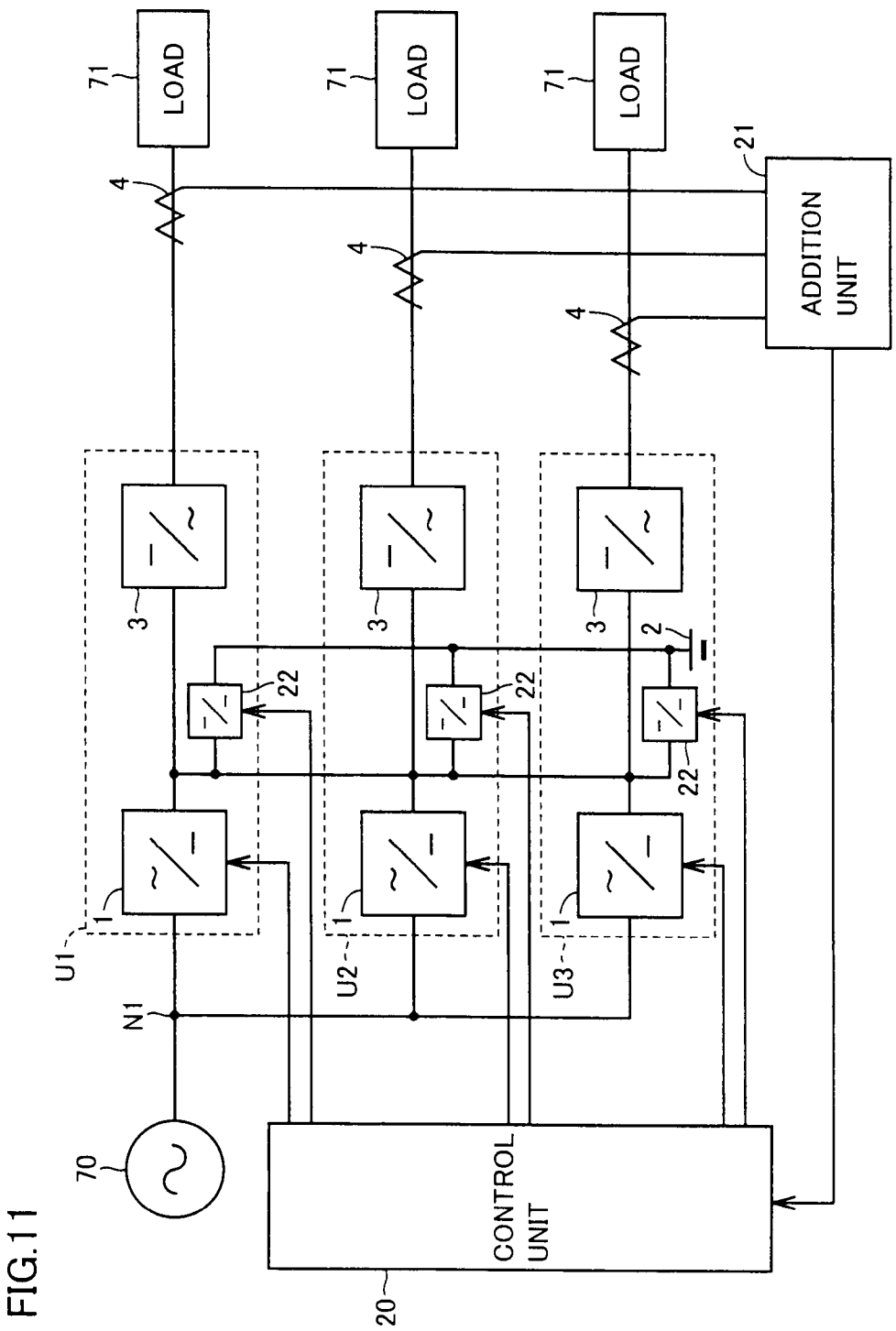
FIG. 11 is a circuit block diagram showing still another modification of the first embodiment.

FIG. 11 is a circuit block diagram showing Modification 11 of the first embodiment, and also shows a diagram compared with FIG. 8. Referring to FIG. 11, this Modification 11 is different from Modification 8 in that bidirectional chopper 22 is added to each of uninterruptible power supply devices U1 to U3. The output nodes of converters 1 of uninterruptible power supply devices U1 to U3 are connected to one another. Bidirectional choppers 22 each have an input node connected to the output node of the corresponding one of converters 1. Battery 2 has a positive electrode connected to the output node of each of bidirectional choppers 22. The operation of each of bidirectional chopper 22 and control unit 20 is as described in Modification 10. The same effect as that in the first embodiment can be achieved also in this Modification 11.

It is to be noted that the above-described first embodiment may be combined with Modifications 1 to 11 as appropriate.

Second Embodiment

Figure 12:
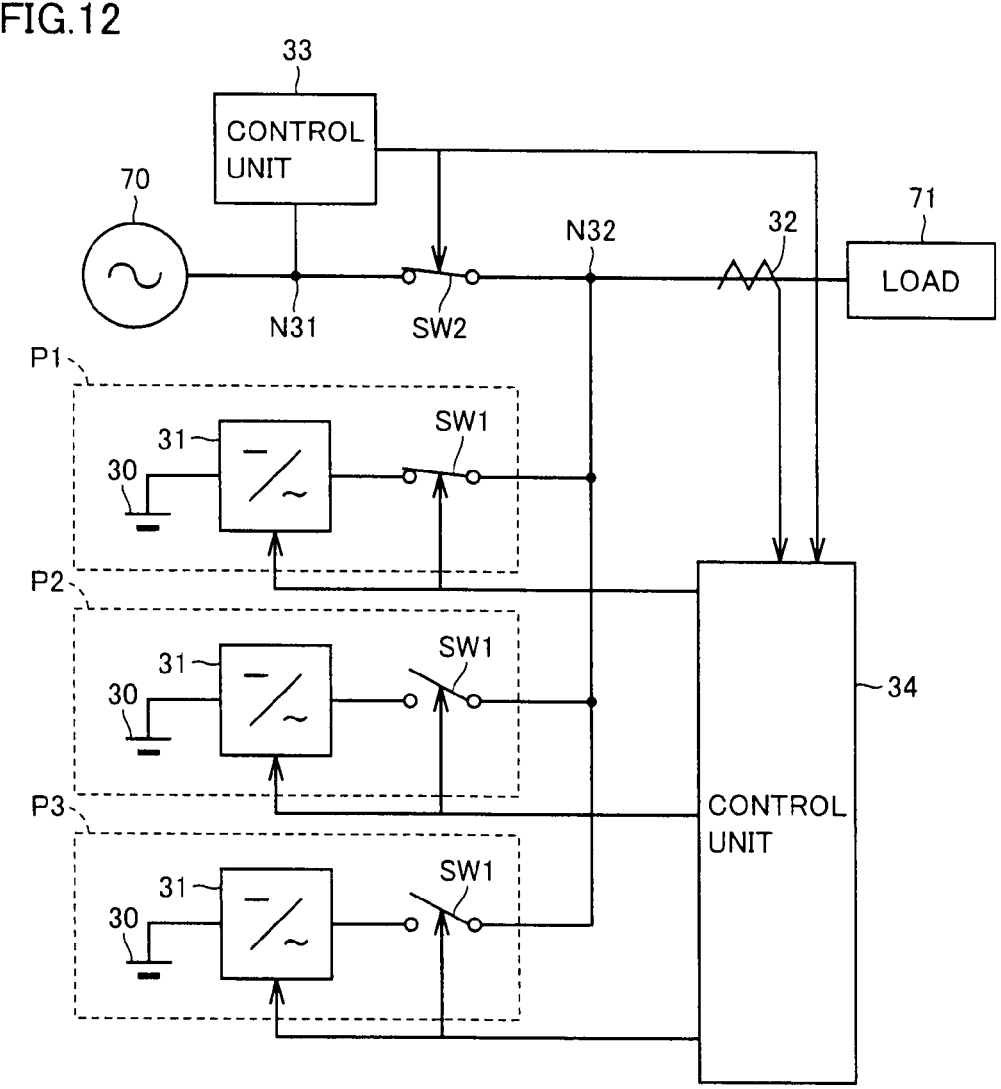
FIG. 12 is a circuit block diagram showing the configuration of an uninterruptible power supply system according to the second embodiment of the present invention.

FIG. 12 is a circuit block diagram showing the configuration of an uninterruptible power supply device according to the second embodiment of the present invention. In FIG. 12, this uninterruptible power supply system includes a plurality of (three in the figure) power conversion devices P1 to P3, a switch SW2, a current sensor 32, and control units 33 and 34. Switch SW2 has one terminal connected to a node N31 which is connected to commercial AC power supply 70. Switch SW2 has the other terminal connected to a node N32 which is connected to load 71.

Each of power conversion devices P1 to P3 includes a battery 30, a DC/AC converter 31 and a switch SW1. Battery 30 has a positive electrode connected to a DC terminal of DC/AC converter 31. DC/AC converter 31 has an AC terminal connected to node N32 via switch SW1. When the AC power is supplied from commercial AC power supply 70, DC/AC converter 31 converts the AC power into DC power and stores the DC power in battery 30. At the time of interruption, DC/AC converter 31 converts the DC power in battery 30 into AC power of a commercial frequency. Battery 30 stores the DC power generated in DC/AC converter 31.

Control unit 33 detects whether or not the AC power is supplied from commercial AC power supply 70, and supplies the signal indicating the detection result to switch SW2 and control unit 34. Switch SW2 is controlled by the signal from control unit 30 such that switch SW2 is brought into conduction when the AC power is supplied from commercial AC power supply 70, and such that switch SW2 is brought out of conduction at the time of interruption. Current sensor 32 detects the current flowing from node N32 into load 71 and supplies the signal indicating the detected current value to control unit 34.

Control unit 34 controls each of power conversion devices P1 to P3 based on the signal from each of control unit 33 and current sensor 32. In other words, based on the output signal from current sensor 4, control unit 34 obtains the required number of power conversion devices for driving load 71 (for example, one), and selects the corresponding number of power conversion devices (for example, P1), to cause only the selected power conversion device (in this case, P1) to be operated and cause the remaining power conversion devices (in this case, P2 and P3) to be stopped.

In the power conversion device selected by control unit 34 (in this case, P1), switch SW1 is brought into conduction, and DC/AC converter 31 performs a power conversion operation instructed by control unit 34. In the power conversion devices not selected by control unit 34 (in this case, P2 and P3), switch SW1 is brought out of conduction, and thus, DC/AC converter 31 does not perform a power conversion operation.

Furthermore, control unit 34 changes the power conversion devices to be operated from one to another in a predetermined cycle such that the plurality of power conversion devices P1 to P3 are equal in operation time to one another. The rotation of the power conversion devices to be operated is as described in the first embodiment. For example, control unit 34 changes the power conversion devices to be operated from one to another in a one-day cycle, to cause three power conversion devices P1 to P3 to be operated sequentially one by one. In addition, control units 33 and 34 may be included in the control unit (not shown) of each of power conversion devices P1 to P3, to cause control units 33 and 34 in one power conversion device to control three power conversion devices P1 to P3.

When the AC power is supplied from commercial AC power supply 70, switch SW2 is brought into conduction and the AC power from commercial AC power supply 70 is supplied via switch SW2 to load 71. Furthermore, in the power conversion device selected by control unit 34 (in this case, P1), switch SW1 is brought into conduction and the AC power from commercial AC power supply 70 is supplied via switch SW1 to DC/AC converter 31. DC/AC converter 31 converts the AC power into DC power and stores the DC power in battery 30. Furthermore, in each power conversion device not selected by control unit 34 (in this case, P2 and P3), switch SW1 is brought out of conduction, and thus, DC/AC converter 31 does not perform a power conversion operation.

At the time of interruption, switch SW2 is brought out of conduction, and thus, commercial AC power supply 70 is electrically disconnected from node N32. Furthermore, in the power conversion device selected by control unit 34 (in this case, P1), DC/AC converter 31 converts the DC power from battery 30 into AC power and supplies the AC power to load 71. Therefore, load 71 can be driven even at the time of interruption as long as the DC power is stored in battery 30. In addition, in each power conversion device not selected by control unit 34 (in this case, P2 and P3), switch SW1 remains in the nonconductive state, and thus, DC/AC converter 31 does not perform a power conversion operation.

In this second embodiment, the required number of power conversion devices for driving load 71 is selected from three power conversion devices P1 to P3, to cause each selected power conversion device to be operated and to cause each remaining power conversion device to be stopped. Therefore, as compared with the case where all of power conversion devices P1 to P3 are operated irrespective of the load current, the loss occurring in each of power conversion devices P1 to P3 can be reduced and the efficiency can be improved.

Furthermore, the power conversion devices to be operated are changed from one to another in a predetermined cycle such that three power conversion devices P1 to P3 are identical in operation time to one another. Consequently, the continuous operation time of each of the power conversion devices can be shortened, and thus, failures occurring in each power conversion device can be reduced. Furthermore, it becomes also possible to immediately find the power conversion device suffering a failure while it is stopped.

Third Embodiment

Figure 13:
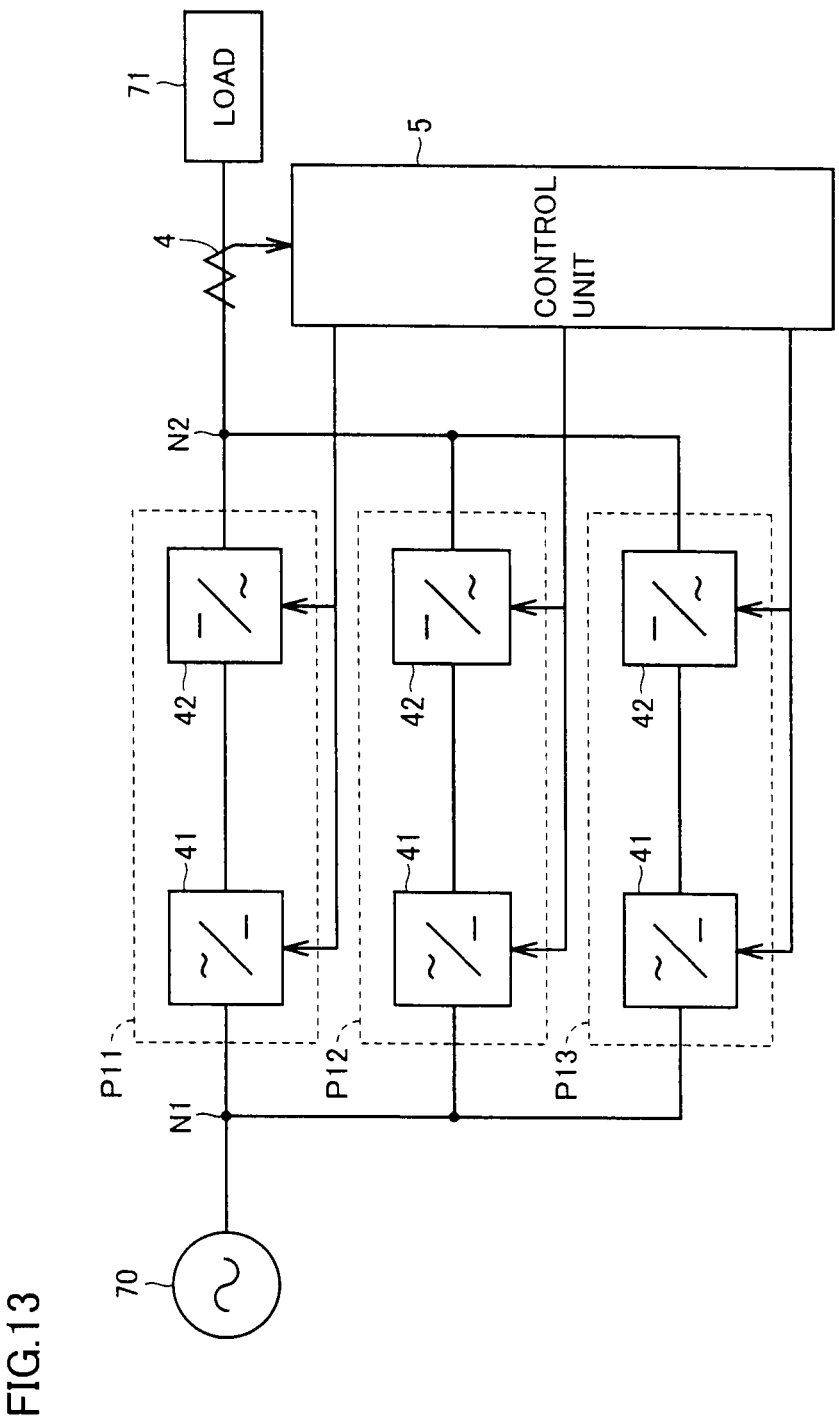
FIG. 13 is a circuit block diagram showing the configuration of a frequency conversion system according to the third embodiment of the present invention.

FIG. 13 is a circuit block diagram showing the configuration of a frequency conversion system according to the third embodiment of the present invention, and also shows a diagram compared with FIG. 1. Referring to FIG. 13, this frequency conversion system is different from the uninterruptible power supply system in FIG. 1 in that uninterruptible power supply devices U1 to U3 are replaced with frequency conversion devices P11 to P13, respectively. Each of frequency conversion devices P11 to P13 includes a converter 41 and an inverter 42.

Three converters 41 each have an input node connected in common to node N1. Node N1 is connected to commercial AC power supply 70. Converter 41 converts the commercial AC power from commercial AC power supply 70 into DC power. Inverter 42 converts the DC power supplied from converter 41 into AC power of a frequency different from the commercial frequency. Three inverters 42 each have an output node connected in common to node N2. Node N2 is connected to load 71.

Current sensor 4 detects the current flowing from node N2 into load 71 and supplies the signal indicating the detected current value to control unit 5. Based on the output signal from current sensor 4, control unit 5 obtains the required number of frequency conversion devices for driving load 71 (for example, one), to cause only the corresponding number of frequency conversion devices (for example, P11) to be operated and to cause the remaining frequency conversion devices (in this case, P12 and P13) to be stopped.

Furthermore, control unit 5 changes the frequency conversion devices to be operated from one to another in a predetermined cycle such that the plurality of frequency conversion devices P11 to P13 are identical in operation time to one another. The rotation of the frequency conversion devices to be operated is the same as that in the first embodiment. For example, control unit 5 changes the frequency conversion devices to be operated from one to another in a one-day cycle to cause three frequency conversion devices P11 to P13 to be operated sequentially one by one. In addition, control unit 5 may be included in the control unit (not shown) of each of frequency conversion devices P11 to P13, to cause control unit 5 of one frequency conversion device to control three frequency conversion devices P11 to P13.

In this third embodiment, the required number of frequency conversion devices for driving load 71 is selected from three frequency conversion devices P11 to P13, to cause each selected frequency conversion device to be operated and to cause each remaining frequency conversion device to be stopped. Therefore, as compared with the case where all of frequency conversion devices P11 to P13 are operated irrespective of the load current, a loss occurring in each of frequency conversion devices U1 to U3 can be reduced, and thus, the efficiency can be improved.

Furthermore, the frequency conversion devices to be operated are changed from one to another in a predetermined cycle such that three frequency conversion devices P11 to P13 are identical in operation time to one another. Consequently, the continuous operation time of each of the frequency conversion devices can be shortened, and thus, failures occurring in each frequency conversion device can be reduced. Furthermore, it becomes also possible to immediately find the frequency conversion device suffering a failure while it is stopped.

Fourth Embodiment

Figure 14:
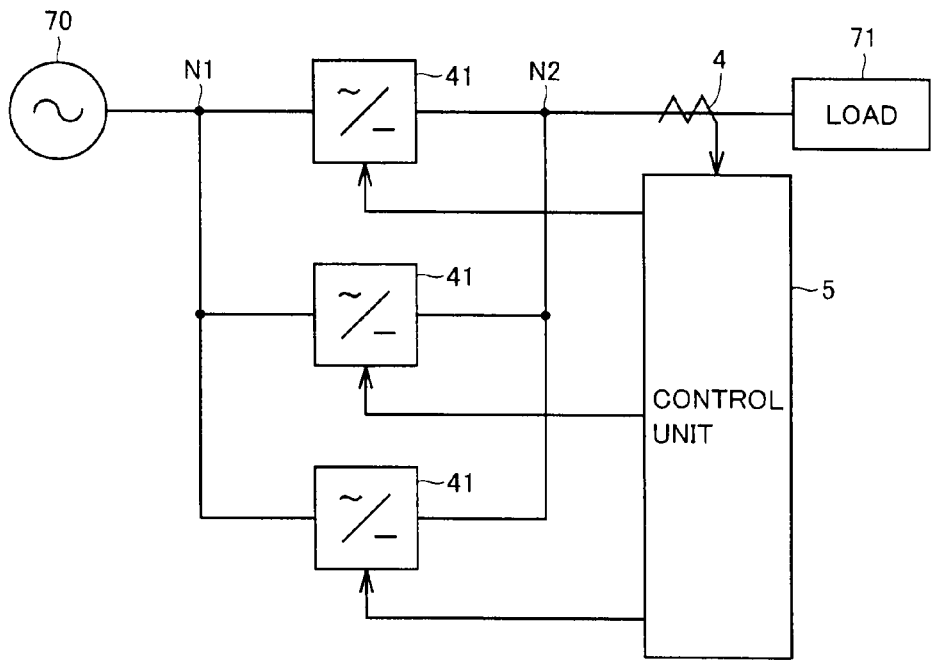
FIG. 14 is a circuit block diagram showing the configuration of a power conversion system according to the fourth embodiment of the present invention.

FIG. 14 is a circuit block diagram showing the configuration of a power conversion device according to the fourth embodiment of the present invention, and also shows a diagram compared with FIG. 13. Referring to FIG. 14, this power conversion device is different from the frequency conversion system in FIG. 13 in that frequency conversion devices P11 to P13 are replaced with converters 41, respectively.

Three converters 41 each have an input node connected in common to node N1 and each also have an output node connected in common to node N2. Node N1 is connected to commercial AC power supply 70 while node N2 is connected to load 71. Converter 41 converts the commercial AC power from commercial AC power supply 70 into DC power.

Current sensor 4 detects the current flowing from node N2 into load 71 and supplies the signal indicating the detected current value to control unit 5. Based on the output signal from current sensor 4, control unit 5 obtains the required number of converters 41 for driving load 71 (for example, one), to cause only the corresponding number of converters 41 to be operated and to cause the remaining number of converters 41 to be stopped.

Furthermore, control unit 5 changes converters 41 to be operated from one to another in a predetermined cycle such that the plurality of converters 41 are identical in operation time to one another. The rotation of the converters to be operated is the same as that in the first embodiment. For example, control unit 5 changes converters 41 to be operated from one to another in a one-day cycle, to cause three converters 41 to be operated sequentially one by one. In addition, control unit 5 may be included in the control unit (not shown) of each of converters 41, to cause control unit 5 of one converter 41 to control three converters 41.

In this fourth embodiment, the required number of converters 41 for driving load 71 is selected from three converters 41, to cause each selected converter 41 to be operated and cause each remaining converter 41 to be stopped. Therefore, as compared with the case where all of converters 41 are operated irrespective of the load current, a loss occurring in each converter 41 can be reduced, and thus, the efficiency can be improved.

Furthermore, converters 41 to be operated are changed from one to another in a predetermined cycle such that three converters 41 are identical in operation time to one another. Consequently, the continuous operation time of each of converters 41 can be shortened, and thus, failures occurring in each converter 41 can be reduced. Furthermore, it becomes also possible to immediately find converter 41 suffering a failure while it is stopped.

Figure 15:
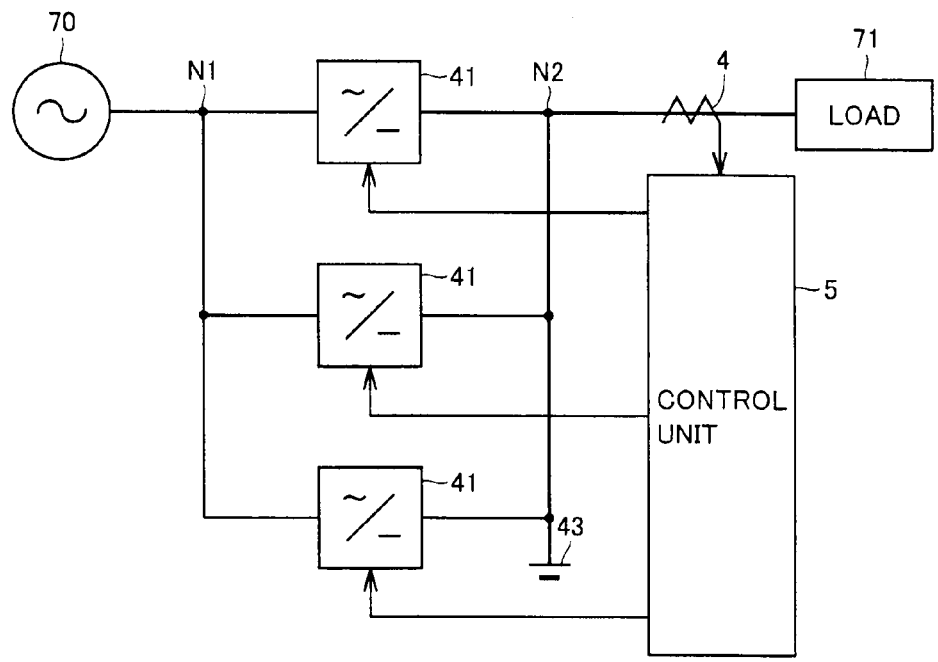
FIG. 15 is a circuit block diagram showing a modification of the fourth embodiment.

FIG. 15 is a circuit block diagram showing the modification of this fourth embodiment, and also shows a diagram compared with FIG. 14. Referring to FIG. 15, this modification is different in that a battery 43 is added to the power conversion device in FIG. 14. Battery 43 has a positive electrode connected to node N2.

When the AC power is supplied from commercial AC power supply 70, the DC power generated in converter 41 is stored in battery 43 and also supplied to load 71. When commercial AC power supply 70 stops supplying the AC power (at the time of interruption), converter 41 is stopped and the DC power stored in battery 43 is supplied to load 71. Therefore, load 71 can be driven even at the time of interruption during the time period while the DC power is stored in battery 43.

Furthermore, in the case where the capacity (power consumption) of load 71 is equal to the output of one converter 41, this power conversion device has a redundancy function. In other words, even when a failure occurs in one converter 41 which is the only converter that is being operated, if load 71 can be driven by the power of battery 43 only for the time period until another one converter 41 is started, no adverse effect is to be exerted on load 71.

Fifth Embodiment

Figure 16:
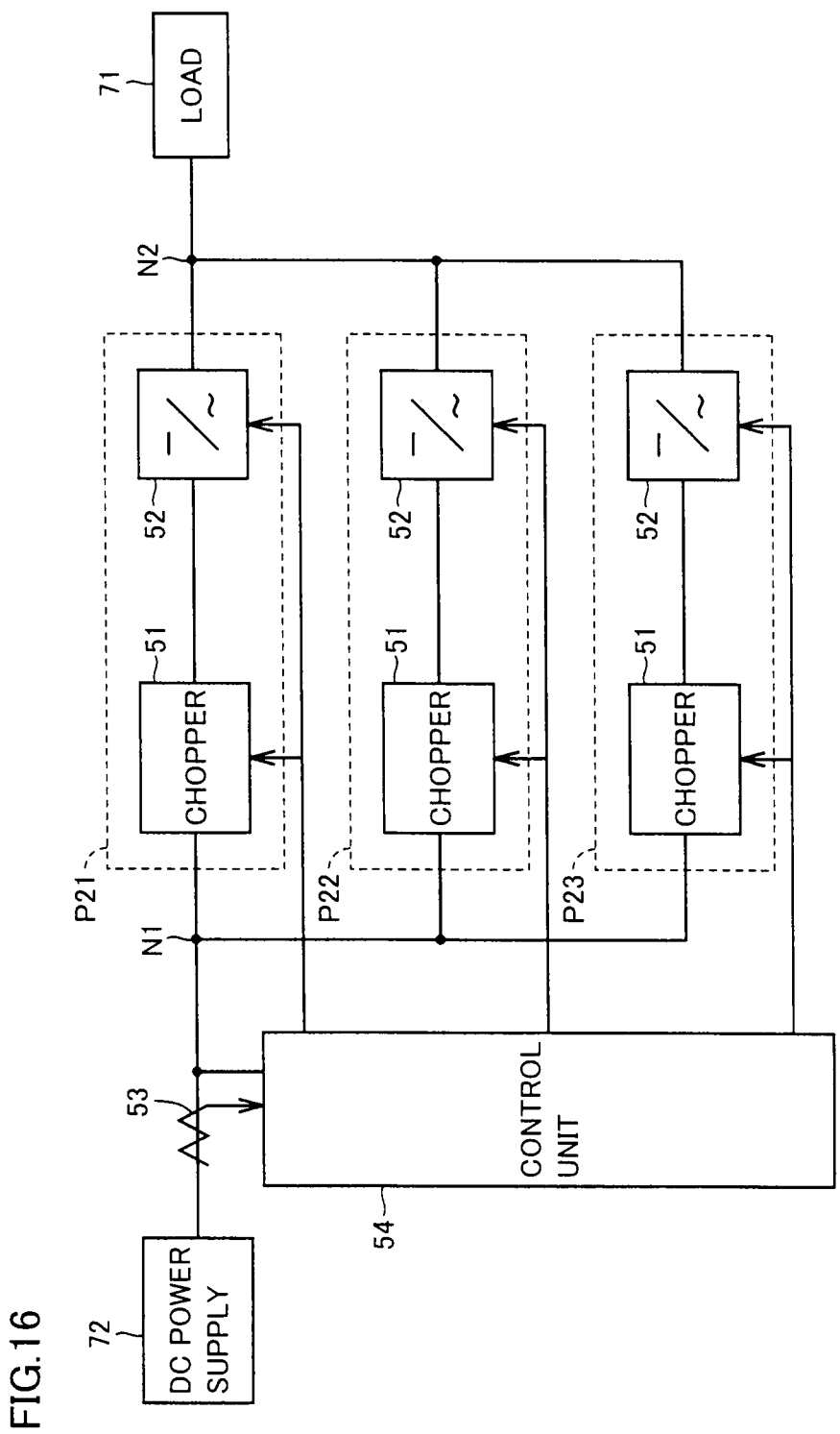
FIG. 16 is a circuit block diagram showing the configuration of a power conversion system according to the fifth embodiment of the present invention.

FIG. 16 is a circuit block diagram showing the configuration of a power conversion system according to the fifth embodiment of the present invention. In FIG. 16, this power conversion system includes a plurality of (three in the figure) power conversion devices P21 to P23, a current sensor 53, and a control unit 54. Power conversion devices P21 to P23 are connected in parallel between a DC power supply 72 and load 71. DC power supply 72 is, for example, a solar battery panel and generates DC power.

Each of power conversion devices P21 to P23 includes a chopper 51 and an inverter 52. Three choppers 51 each have an input node connected in common to node N1 that is connected to DC power supply 72. Chopper 51 boosts the output voltage of DC power supply 72 to a prescribed DC voltage, and supplies the DC voltage to inverter 52. Inverter 52 converts the DC power supplied from chopper 51 into AC power. Three inverters 52 each have an output node connected in common to node N2. Node N2 is connected to load 71.

Current sensor 53 detects the current flowing from DC power supply 72 into node N1 and supplies the signal indicating the detected current value to control unit 54. Based on the output signal of current sensor 53 and the output voltage of DC power supply 72, control unit 54 obtains the required number of power conversion devices (for example, one) for converting the DC power generated in DC power supply 72 into AC power, to cause only the corresponding number of power conversion devices (for example, P21) to be operated and cause the remaining power conversion devices (in this case, P22 and P23) to be stopped.

Furthermore, control unit 54 changes the power conversion devices to be operated from one to another in a predetermined cycle such that the plurality of power conversion devices P21 to P23 are identical in operation time to one another. The rotation of the power conversion devices to be operated is the same as that in the first embodiment. For example, control unit 54 changes the power conversion devices to be operated from one to another in a one-day cycle, to cause three power conversion devices P21 to P23 to be operated sequentially one by one. It is to be noted that control unit 54 may be included in the control unit (not shown) of each of power conversion devices P21 to P23, to cause control unit 54 of one of power conversion devices P21 to P23 to control three control power conversion devices P21 to P23.

In this fifth embodiment, the required number of power conversion devices for converting the DC power generated in DC power supply 72 into AC power is selected from three power conversion devices P21 to P23, to cause each selected power conversion device to be operated and to cause each remaining power conversion device to be stopped. Therefore, as compared with the case where all of the power conversion devices are operated irrespective of the load current, a loss occurring in each power conversion device can be reduced, and thus, the efficiency can be improved.

Furthermore, the power conversion devices to be operated are changed from one to another in a predetermined cycle such that three power conversion devices P21 to P23 are identical in operation time to one another. Consequently, the continuous operation time of each of the power conversion devices can be shortened, and thus, failures occurring in each power conversion device can be reduced. Furthermore, it becomes also possible to immediately find the power conversion device suffering a failure while it is stopped.

Figure 17:
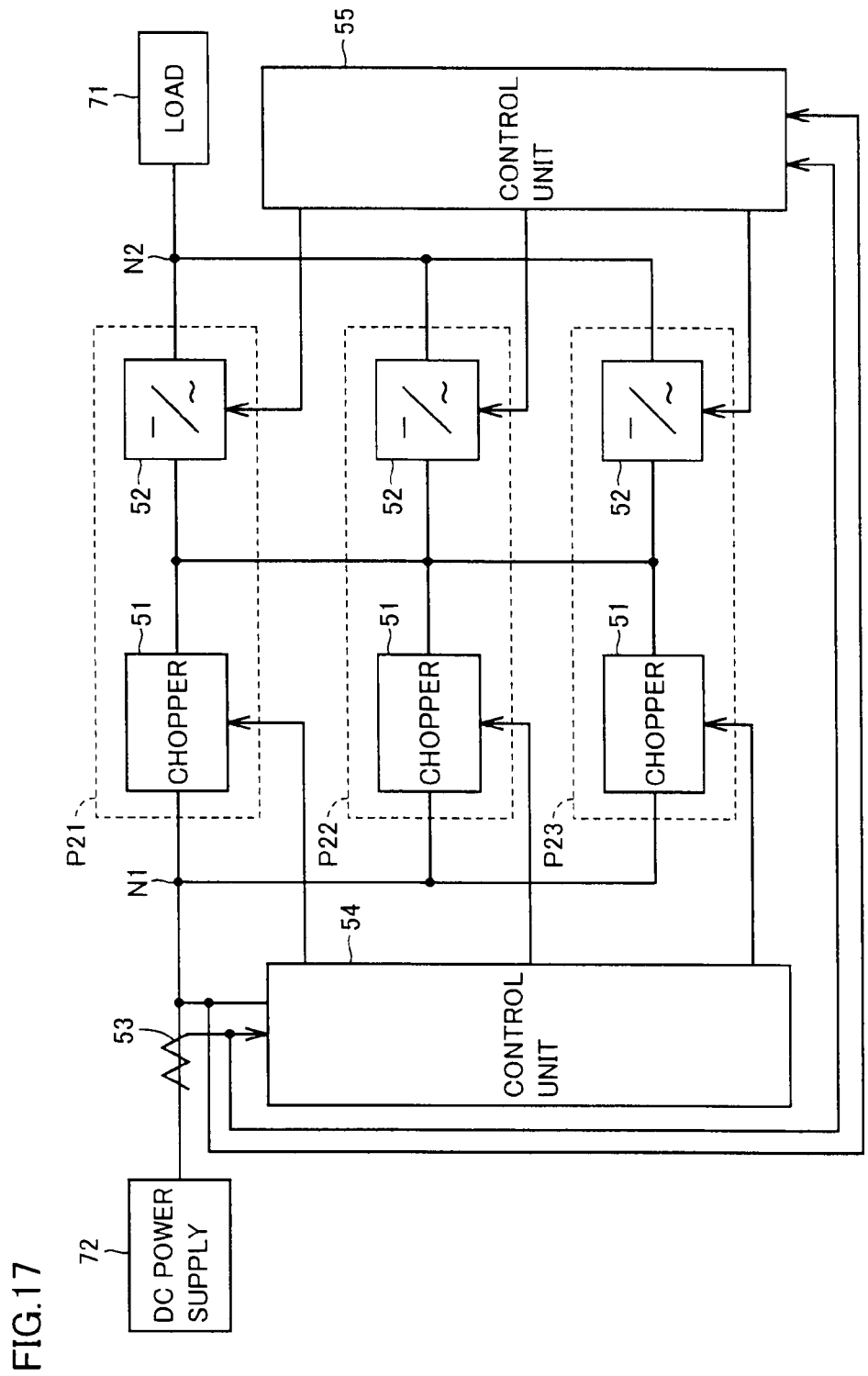
FIG. 17 is a circuit block diagram showing a modification of the fifth embodiment.

FIG. 17 is a circuit block diagram showing a modification of the fifth embodiment, and also shows a diagram compared with FIG. 16. Referring to FIG. 17, this modification is different from the fifth embodiment in that the output nodes of three choppers 51 are connected to the output nodes of three inverters 52, respectively, and control unit 55 is added.

Control unit 55 is identical in configuration to control unit 54. Control unit 54 controls three choppers 51 to be operated/stopped while control unit 55 controls three inverters 52 to be operated/stopped. In other words, control unit 54 selects the required number of choppers 51 for boosting the DC voltage generated in DC power supply 72 to a prescribed DC voltage in accordance with the output current and the output voltage of DC power supply 72, to cause each selected chopper 51 to be operated and to cause each remaining chopper 51 to be stopped. In addition, control unit 54 also changes choppers 51 to be operated from one to another in a predetermined cycle such that three choppers 51 are identical in operation time to one another. Furthermore, when a failure occurs in one chopper 51, control unit 54 controls remaining two choppers 51 to be operated/stopped, and changes choppers 51 to be operated from one to another in a predetermined cycle such that two choppers 51 are identical in operation time to each other.

Similarly, control unit 55 selects the required number of inverters 52 for converting the DC power generated in DC power supply 72 into AC power in accordance with the output current and the output voltage of DC power supply 72, to cause each selected inverter 52 to be operated and to cause each remaining inverter 52 to be stopped. In addition, control unit 55 also changes inverters 52 to be operated from one to another in a predetermined cycle such that three inverters 52 are identical in operation time to one another. Furthermore, when a failure occurs in one inverter 52, control unit 55 controls remaining two inverters 52 to be operated/stopped, and changes inverters 52 to be operated from one to another in a predetermined cycle such that two inverters 52 are identical in operation time to each other. The same effect as that in the fifth embodiment can be achieved also in this Modification.

Figure 18:
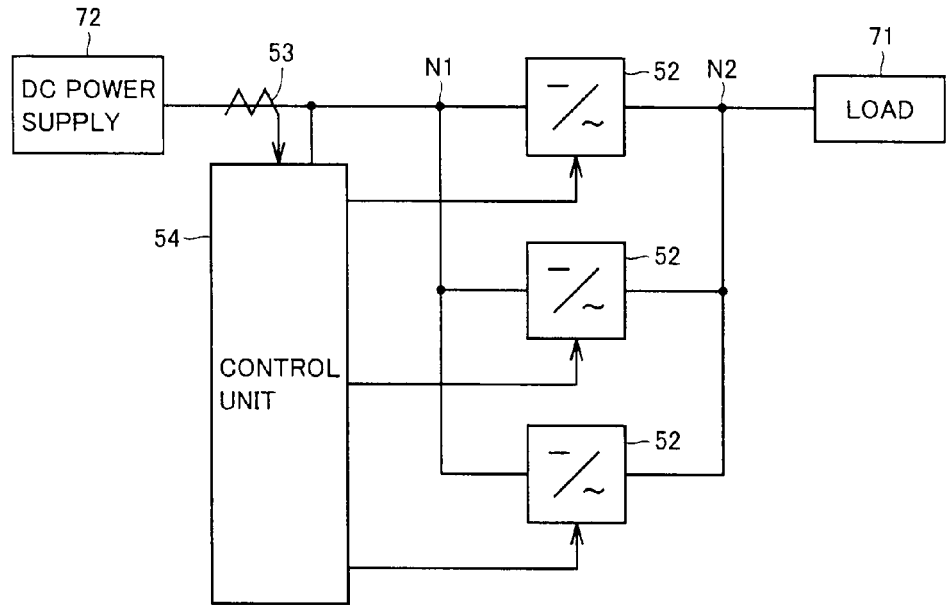
FIG. 18 is a circuit block diagram showing another modification of the fifth embodiment.

FIG. 18 is a circuit block diagram showing another modification of the fifth embodiment, and also shows a diagram compared with FIG. 16. Referring to FIG. 18, this Modification is different from the fifth embodiment in that three choppers 51 are removed and three inverters 52 each have an input node connected in common to node N1.

Based on the output signal of current sensor 53 and the output voltage of DC power supply 72, control unit 54 obtains the required number (for example, one) of inverters 52 for converting the DC power generated in DC power supply 72 into AC power, to cause only the corresponding number of inverters 52 to be operated and to cause each remaining inverter 52 to be stopped.

Furthermore, control unit 54 changes inverters 52 to be operated from one to another in a predetermined cycle such that the plurality of inverters 52 are identical in operation time to one another. The rotation of inverters 52 to be operated is the same as that in the first embodiment. For example, control unit 54 changes inverters 52 to be operated from one to another in a one-day cycle, to cause three inverters 52 to be operated sequentially one by one. In addition, control unit 54 may be included in the control unit (not shown) of each of inverters 52, to cause control unit 54 of one inverter 52 to control three inverters 52. The same effect as that in the fifth embodiment can also be achieved in this Modification.

Sixth Embodiment

Figure 19:
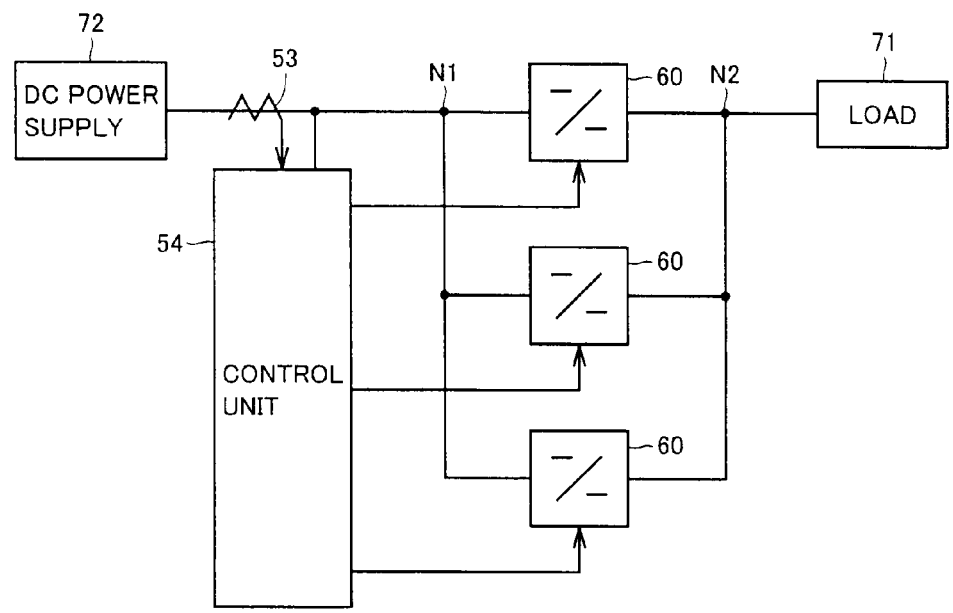
FIG. 19 is a circuit block diagram showing the configuration of a power conversion device according to the sixth embodiment of the present invention.

FIG. 19 is a circuit block diagram showing the configuration of a power conversion device according to the sixth embodiment of the present invention, and also shows a diagram compared with FIG. 18. Referring to FIG. 19, this power conversion device is different from the power conversion device in FIG. 18 in that three inverters 52 are replaced with three DC/DC converters 60.

Three DC/DC converters 60 each have an input node connected in common to node N1 and an output node connected in common to node N2. Node N1 is connected to DC power supply 72 while node N2 is connected to load 71. DC/DC converter 60 converts the output voltage of DC power supply 72 into a prescribed DC voltage, and supplies the DC voltage to load 71.

Based on the output signal of current sensor 53 and the output voltage of DC power supply 72, control unit 54 obtains the required number (for example, one) of DC/DC converters 60 for converting the output voltage of DC power supply 72 into a prescribed DC voltage, to cause only the corresponding number of DC/DC converters 60 to be operated and to cause each remaining DC/DC converter 60 to be stopped.

Furthermore, control unit 54 changes DC/DC converters 60 to be operated from one to another in a predetermined cycle such that the plurality of DC/DC converters 60 are identical in operation time to one another. The rotation of DC/DC converters 60 to be operated is the same as that in the first embodiment. For example, control unit 54 changes DC/DC converters 60 to be operated from one to another in a one-day cycle, to cause three DC/DC converters 60 to be operated sequentially one by one. In addition, control unit 54 may be included in the control unit (not shown) of each of DC/DC converters 60, to cause control unit 54 of one DC/DC converter 60 to control three DC/DC converters 60.

In this sixth embodiment, the required number of DC/DC converters 60 for converting the first DC power generated in DC power supply 72 into second DC power is selected from three DC/DC converters 60, to cause each selected DC/DC converter 60 to be operated and cause each remaining DC/DC converter 60 to be stopped. Therefore, as compared with the case where all of DC/DC converters 60 are operated irrespective of the load current, a loss occurring in each DC/DC converter 60 can be reduced, and thus, the efficiency can be improved.

Furthermore, DC/DC converters 60 to be operated are changed from one to another in a predetermined cycle such that three DC/DC converters 60 are identical in operation time to one another. Therefore, the continuous operation time of each DC/DC converter 60 can be shortened, and thus, failures occurring in each DC/DC converter 60 can be reduced. Furthermore, it becomes also possible to immediately find DC/DC converter 60 suffering a failure while it is stopped.

Figure 20:
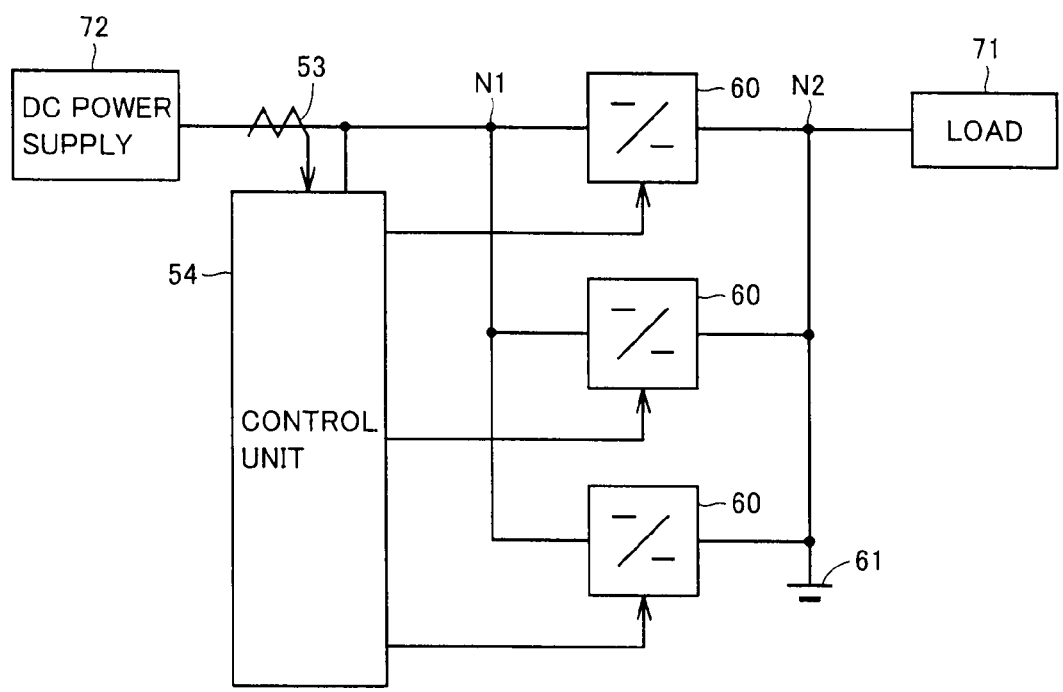
FIG. 20 is a circuit block diagram showing a modification of the sixth embodiment.

FIG. 20 is a circuit block diagram showing a modification of this sixth embodiment, and also shows a diagram compared with FIG. 19. Referring to FIG. 20, this modification is different in that battery 61 is added to the power conversion device in FIG. 19. Battery 61 has a positive electrode connected to node N2.

When the DC power is supplied from DC power supply 72, the DC power generated in DC/DC converter 60 is stored in battery 61 and also supplied to load 71. When DC power supply 72 stops supplying the DC power, DC/DC converter 60 is stopped and the DC power stored in battery 61 is supplied to load 71. Therefore, as long as the DC power is stored in battery 61, load 71 can be driven even at the time when DC power supply 72 stops supplying DC power.

Furthermore, when the capacity (power consumption) of load 71 is equal to the output of one DC/DC converter 60, this power conversion device has a redundancy function. In other words, even when a failure occurs in one DC/DC converter 60 which is the only DC/DC converter 60 that is being operated, if load 71 can be driven by the power of battery 61 only for the time period until another one of DC/DC converters 60 is started, no adverse effect is to be exerted on load 71.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

U1 to U3 uninterruptible power supply device, 1, 41 converter, 2, 30, 43, 61 battery, 3, 42, 52 inverter, 4, 32, 53 current sensor, 5, 20, 33, 34, 54, 55 control unit, 11, 12 comparison circuit, 13 operation device number determination unit, 14 timer, 15 storage unit, 16 failure detection unit, 17 operation instruction unit, 21 addition unit, 22 bidirectional chopper, P1 to P3, P21 to P23 power conversion device, 31 DC/AC converter, SW1, SW2 switch, P11 to P13 frequency conversion device, 51 chopper, 60 DC/DC converter, 70 commercial AC power supply, 71 load, 72 DC power supply.

The invention claimed is:

1. A power conversion system comprising:
a plurality of power conversion devices connected in parallel between a power supply and a load, said plurality of power conversion devices each converting first power supplied from said power supply into second power and supplying the second power to said load; and
circuitry configured to select a required number of power conversion devices for converting said first power into said second power from said plurality of power conversion devices, to cause each of selected power conversion devices to be operated and to cause each of remaining power conversion devices to be stopped,
said circuitry changing the power conversion devices to be operated in a predetermined cycle such that said plurality of power conversion devices are identical in operation time to one another and operate in a predetermined sequential order.

2. The power conversion system according to claim 1, wherein said circuitry is configured to:
select the required number of power conversion devices for converting said first power into said second power from the plurality of power conversion devices that normally operate, without selecting the power conversion devices each having a failure from said plurality of power conversion devices, and
change the power conversion devices to be operated in the predetermined cycle such that said plurality of power conversion devices that normally operate are identical in operation time to one another.

3. The power conversion system according to claim 1, wherein the required number of power conversion devices for converting said first power into said second power includes a required minimum number of power conversion devices for converting said first power into said second power.

4. The power conversion system according to claim 3, wherein the required number of power conversion devices for converting said first power into said second power further includes a spare power conversion device.

5. The power conversion system according to claim 1, wherein said circuitry is configured to select the required number of power conversion devices for converting said first power into said second power based on at least one of said first power and said second power.

6. The power conversion system according to claim 1, wherein
said second power is power required for driving said load, and
said circuitry is configured to select a required number of power conversion devices for driving said load as the required number of power conversion devices for converting said first power into said second power.

7. The power conversion system according to claim 1, wherein
said first power is power generated in said power supply, and
said circuitry is configured to select a required number of power conversion devices for converting the power generated in said power supply into said second power as the required number of power conversion devices for converting said first power into said second power.

8. The power conversion system according to claim 1, wherein
said power supply is a commercial alternating current (AC) power supply,
said first power is first AC power of a commercial frequency,
said second power is second AC power of said commercial frequency,
each of said plurality of power conversion devices is an uninterruptible power supply device,
said circuitry is configured to select a required number of uninterruptible power supply devices for driving said load as a required number of power conversion devices for converting said first AC power into said second AC power,
each uninterruptible power supply device includes:
a converter converting said first AC power supplied from said commercial AC power supply into direct current (DC) power, and
an inverter converting said DC power supplied from said converter into said second AC power and supplying said second AC power to said load, and
when said first AC power is supplied from said commercial AC power supply, said DC power generated in said converter is supplied to said inverter and stored in a power storage device, and when said commercial AC power supply stops supplying said first AC power, an operation of said converter is stopped and said power storage device supplies said DC power to said inverter.

9. The power conversion system according to claim 8, wherein each uninterruptible power supply device further includes a bidirectional chopper supplying said DC power generated in said converter to said power storage device when said first AC power is supplied from said commercial AC power supply, and supplying said DC power from said power storage device to said inverter when said commercial AC power supply stops supplying said first AC power.

10. The power conversion system according to claim 1, wherein
said power supply is a commercial AC power supply,
said first power is first AC power of a commercial frequency,
said second power is second AC power of a frequency different from said commercial frequency,
said circuitry is configured to select a required number of power conversion devices for driving said load as a required number of power conversion devices for converting said first AC power into said second AC power, and each of the power conversion devices includes:
a converter converting said first AC power supplied from said commercial AC power supply into DC power, and
an inverter converting said DC power supplied from said converter into said second AC power and supplying said second AC power to said load.

11. The power conversion system according to claim 1, wherein
said power supply is a DC power supply,
said first power is DC power,
said second power is AC power,
said circuitry is configured to select a required number of power conversion devices for converting said DC power generated in said DC power supply into said AC power as the required number of power conversion devices for converting said first power into said second power, and
each of the power conversion devices includes an inverter converting said DC power supplied from said DC power supply into said AC power and supplying said AC power to said load.

12. The power conversion system according to claim 1, wherein
said power supply is a DC power supply,
said first power is DC power,
said second power is AC power,
said circuitry is configured to select a required number of power conversion devices for converting said DC power generated in said DC power supply into said AC power as the required number of power conversion devices for converting said first power into said second power, and
each of the power conversion devices includes:
a chopper converting an output voltage of said DC power supply into a predetermined DC voltage, and
an inverter converting the output voltage of said chopper into an AC voltage and supplying the AC voltage to said load.

13. The power conversion system according to claim 12, wherein input nodes of inverters of said plurality of power conversion devices are connected to one another.

14. The power conversion system according to claim 1, wherein
said power supply is a DC power supply,
said first power is first DC power,
said second power is second DC power,
said circuitry is configured to select a required number of power conversion devices for converting said first DC power generated in said DC power supply into said second DC power as the required number of power conversion devices for converting said first power into said second power, and
each of the power conversion devices includes a converter converting an output voltage of said DC power supply into a predetermined DC voltage and supplying the DC voltage to said load.

15. The power conversion system according to claim 14, further comprising a power storage device connected to an output node of said converter, wherein
when said DC power supply supplies said first DC power, said second DC power generated in said converter is supplied to said load and stored in said power storage device, and
when said DC power supply stops supplying said first DC power, said power storage device supplies said second DC power to said load.

16. An uninterruptible power supply system comprising:
a plurality of uninterruptible power supply devices connected in parallel between a commercial AC power supply and a load, each of the uninterruptible power supply devices including:
   a converter converting first AC power supplied from said commercial AC power supply into DC power, and
   an inverter converting said DC power into second AC power,
said uninterruptible power supply system further comprising:
   circuitry configured to select a required number of inverters for driving said load from a plurality of inverters, to cause each selected inverter to be operated and to cause each remaining inverter to be stopped,
   said circuitry changing the inverters to be operated in a predetermined cycle such that said plurality of inverters are identical in operation time to one another and operate in a predetermined sequential order.

17. An uninterruptible power supply system comprising:
a plurality of uninterruptible power supply devices connected in parallel between a commercial AC power supply and a load; and
a power storage device provided in common among said plurality of uninterruptible power supply devices and storing DC power,
each of the uninterruptible power supply devices including:
   a converter converting first AC power supplied from said commercial AC power supply into DC power, and
   an inverter converting the DC power supplied from said converter or said power storage device into second AC power,
said power storage device storing the DC power generated in the converter of each of said plurality of uninterruptible power supply devices,
said uninterruptible power supply system further comprising:
   circuitry configured to select a required number of converters for driving said load from a plurality of converters, to cause each selected converter to be operated and to cause each remaining converter to be stopped,
   said circuitry changing the converters to be operated in a predetermined cycle such that said plurality of converters are identical in operation time to one another and operate in a predetermined sequential order.

18. An uninterruptible power supply system comprising:
a plurality of uninterruptible power supply devices; and
a power storage device provided in common among said plurality of uninterruptible power supply devices and storing DC power,
said plurality of uninterruptible power supply devices having input nodes each connected to a commercial AC power supply and output nodes connected to a plurality of loads, respectively,
each of the uninterruptible power supply devices including:
   a converter converting first AC power supplied from said commercial AC power supply into DC power, and
   an inverter converting said DC power supplied from said converter or said power storage device into second AC power,
said power storage device storing said DC power generated in the converter of each of said plurality of uninterruptible power supply devices,
said uninterruptible power supply system further comprising:
   circuitry configured to select a required number of converters for driving said plurality of loads from a plurality of converters, to cause each selected converter to be operated and to cause each remaining converter to be stopped,
   said circuitry changing the converters to be operated in a predetermined cycle such that said plurality of converters are identical in operation time to one another and operate in a predetermined sequential order.

19. The uninterruptible power supply system according to claim 18, wherein
   each of the uninterruptible power supply devices further includes a bidirectional chopper supplying said DC power generated in said converter to said power storage device when said first AC power is supplied from said commercial AC power supply, and supplying said DC power of said power storage device to said inverter when said commercial AC power supply stops supplying said first AC power,
   said inverter converts said DC power supplied from said converter or said bidirectional chopper into said second AC power,
   said power storage device stores said DC power supplied from said bidirectional chopper of each of said plurality of uninterruptible power supply devices, and
   said circuitry is configured to select a required number of bidirectional choppers for driving said plurality of loads from a plurality of bidirectional choppers, to cause each selected bidirectional chopper to be operated and to cause each remaining bidirectional chopper to be stopped, and change the bidirectional choppers to be operated in a predetermined cycle such that said bidirectional choppers are identical in operation time to one another.

* * * * *